(12) United States Patent
Huang et al.

(10) Patent No.: US 11,924,761 B2
(45) Date of Patent: Mar. 5, 2024

(54) COMMUNICATION APPARATUS AND COMMUNICATION METHOD

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/757,217

(22) PCT Filed: Oct. 31, 2018

(86) PCT No.: PCT/JP2018/040514
§ 371 (c)(1),
(2) Date: Apr. 17, 2020

(87) PCT Pub. No.: WO2019/088170
PCT Pub. Date: May 9, 2019

(65) Prior Publication Data
US 2020/0280920 A1    Sep. 3, 2020

(30) Foreign Application Priority Data

Nov. 1, 2017   (JP) ................................. 2017-211978
Dec. 21, 2017  (JP) ................................. 2017-245250

(51) Int. Cl.
*H04W 52/02*    (2009.01)
*H04W 84/12*    (2009.01)

(52) U.S. Cl.
CPC ... *H04W 52/0235* (2013.01); *H04W 52/0216* (2013.01); *H04W 84/12* (2013.01)

(58) Field of Classification Search
CPC ......... H04W 52/0235; H04W 52/0216; H04W 84/12; H04W 76/28; H04W 52/0229; Y02D 30/70
See application file for complete search history.

(56) References Cited

U.S. PATENT DOCUMENTS

2016/0050624 A1* 2/2016 Tirronen ........... H04W 52/0229
                                                    370/311
2017/0280498 A1* 9/2017 Min ..................... H04L 5/0053
(Continued)

OTHER PUBLICATIONS

Alfred Asterjadhi et al., "Considerations on WUR frame format," IEEE 802.11-17/1004r4, Qualcomm Inc, Jul. 4, 2017, 26 pages.
(Continued)

*Primary Examiner* — Dinh Nguyen
(74) *Attorney, Agent, or Firm* — Seed IP Law Group LLP

(57) ABSTRACT

A method of the present disclosure performed by a first communication device comprises determining wake-up operating parameters and entering WUR (wake-up radio) mode by communicating with a second communication device; wherein one of wake-up operating parameters is duty cycle schedule of WUR receiver of the first communication device; and the starting point of the duty cycle schedule of WUR receiver of the first communication device is aligned with TWBTT (target WUR Beacon transmission time).

17 Claims, 33 Drawing Sheets

(56) References Cited

U.S. PATENT DOCUMENTS

| | | | | |
|---|---|---|---|---|
| 2018/0049130 A1* | 2/2018 | Huang | ................ | H04W 56/001 |
| 2018/0279224 A1* | 9/2018 | Yang | ................... | H04W 52/028 |
| 2019/0230581 A1* | 7/2019 | Hwang | ............. | H04W 52/0225 |
| 2019/0320388 A1* | 10/2019 | Li | ..................... | H04W 52/0229 |
| 2020/0059861 A1* | 2/2020 | Huang | ............. | H04W 52/0229 |

OTHER PUBLICATIONS

Igor Kim et al., "Initial Negotiation fur WUR" IEEE 802.11-17/0070r0, ETRI, Jan. 16, 2017, 9 pages.
International Search Report, dated Jan. 8, 2019, for corresponding International Application No. PCT/JP2018/040514, 2 pages.
Po-Kai Huang et al., "High Level MAC Concept for WUR," IEEE 802.11-17/0071r0, Intel, Jan. 12, 2017, 9 pages.
Po-Kai Huang et al., "WUR Beacon," IEEE 802.11-17/0343r3, Intel, Mar. 12, 2017, 15 pages.
Po-Kai Huang et al., "WUR Negotiation and Acknowledgement Procedure Follow up," IEEE 802.11-17/0342r4, Intel, Mar. 12, 2017, 17 pages.
Po-Kai Huang. "Specification Framework for TGba," IEEE 802.11-17/0575r5, Intel, Sep. 29, 2017, 9 pages.
Steve Shellhammer et al., "Considerations on WUR Synchronization," IEEE 802.11-17/0671r3, Qualcomm Inc, May 10, 2017, 6 pages.
Steve Shellhammer et al., "WUR Preamble Bit Duration," IEEE 802.11-17/1354r0, Qualcomm, Sep. 10, 2017, 29 pages.
Suhwook Kim et al., "SFD MAC proposal," IEEE 802.11-17/0379r4, LG Electronics, Mar. 13, 2017, 17 pages.
Yongho Seok et al., "WUR Synchronization," IEEE 802.11-17/1384r0, MediaTek Inc., Sep. 11, 2017, 10 pages.

\* cited by examiner

| Name | Action Type value |
|---|---|
| WUR negotiation | 0 |
| WUR mode entry | 1 |
| Integrated WUR negotiation and WUR mode entry | 2 |
| WUR mode exit | 3 |
| Reserved | 4-255 |

Figure 9

| WUR Action field value | Meaning |
|---|---|
| 0 | WUR Mode Setup |
| 1 | WUR Mode Teardown |
| 2 | WUR Mode Update |

Figure 21

| Action Type field value | Meaning |
|---|---|
| 0 | Enter WUR Mode Request |
| 1 | Enter WUR Mode Response |
| 2 | Enter WUR Mode Suspend Request |
| 3 | Enter WUR Mode Suspend Response |
| 4 | Enter WUR Mode Suspend |
| 5 | Enter WUR Mode |
| 6 | Update WUR Parameters Request |
| 7 | Update WUR Parameters Response |
| 8 | Update WUR Parameters |

Figure 22

| WUR Mode Response Status field value | Meaning |
|---|---|
| 0 | Enter WUR Mode Accept |
| 1 | Enter WUR Mode Suspend Accept |
| 2 | Denied |

Figure 23

COMMUNICATION APPARATUS AND COMMUNICATION METHOD

TECHNICAL FIELD

The present disclosure is generally related to a communication apparatus and a communication method.

BACKGROUND ART

The IEEE (Institute of Electrical and Electronics Engineers) 802.11 Working Group is defining a physical (PHY) layer specification and modifications on medium access control (MAC) layer specification that enable operation of a wake-up radio (WUR) apparatus. The WUR apparatus is a companion radio apparatus to a primary connectivity radio (PCR) apparatus, e.g., IEEE 802.11a/b/g/n/ac/ax radio apparatus. The PCR apparatus included in a wireless communication device is used for user data transmission and reception; while the WUR apparatus included in the device is not used for user data transmission and reception. For the wireless communication device operating in WUR mode, when the PCR apparatus included in the device turns off, the WUR apparatus included in the device turns on or periodically turns on or off. Once there is traffic for the PCR apparatus of the device to transmit or the WUR apparatus of the device receives a wake-up signal alerting that there is traffic for the PCR apparatus of the device to receive, the device turns on the PCR apparatus.

CITATION LIST

Non Patent Literature

NPL 1: IEEE 802.11-17/0379r4, SFD MAC proposal, May 2017
NPL 2: IEEE 802.11-17/0342r4, WUR Negotiation and Acknowledgement Procedure Follow up, March 2017
NPL 3: IEEE 802.11-17/0071r0, High Level MAC Concept for WUR, January 2017
NPL 4: IEEE 802.11-17/0070r0, Initial Negotiation for WUR, January 2017
NPL 5: IEEE 802.11-17/0575r5, Specification Framework for TGba, September 2017
NPL 6: IEEE 802.11-17/0343r3, WUR Beacon, March 2017
NPL 7: IEEE 802.11-17/0671r3, Considerations on WUR Synchronization, May 2017
NPL 8: IEEE 802.11-17/1384r0, WUR Synchronization, September 2017
NPL 9: IEEE 802.11-17/1004r4, Considerations on WUR frame format, July 2017
NPL 10: IEEE 802.11-17/1354r0, WUR Preamble Bit Duration, September 2017

SUMMARY OF INVENTION

Technical Problem

Studies are underway on how a wireless communication device is able to perform WUR mode operation in an efficient manner.

Solution to Problem

One non-limiting and exemplary embodiment of the present disclosure facilitates performing WUR mode operation in an efficient manner.

In one general aspect, the techniques disclosed here feature: a method performed by a first communication device comprises determining wake-up operating parameters and entering WUR (wake-up radio) mode by communicating with a second communication device; wherein one of wake-up operating parameters is duty cycle schedule of WUR receiver of the first communication device; and the starting point of the duty cycle schedule of WUR receiver of the first communication device is aligned with TWBTT (target WUR Beacon transmission time).

It should be noted that general or specific embodiments may be implemented as a system, a method, an integrated circuit, a computer program, a storage medium, or any selective combination thereof.

Advantageous Effects of Invention

By taking advantage of the communication apparatus and the communication method described in the present disclosure, a wireless communication device is able to perform WUR mode operation in an efficient manner.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 9 is a diagram illustrating an example format of Action Type field according to the present disclosure.

FIG. 21 is a diagram illustrating another example format of WUR Action field of WUR Action frame according to the present disclosure.

FIG. 22 is a diagram illustrating another example format of Action Type field of WUR Mode element according to the present disclosure.

FIG. 23 is a diagram illustrating another example format of WUR Mode Response Status field of WUR Mode element according to the present disclosure.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

In any wireless communication system, a wide variety of devices may be a part of the wireless network, each device differing in terms of traffic needs, device capabilities, power supply types and so on. Some class of devices may have less bandwidth requirements and also less stringent QoS (Quality of Service) requirements but may be relatively more concerned about power consumption (e.g., mobile phones). Another class of devices may have low bandwidth requirements as well as very low duty cycles but may be very sensitive to power consumption due to extremely small batteries or extremely long life expectancy (e.g., sensors for remote sensing).

In many wireless communication systems, there will be one or more central controllers which will determine the wireless network coverage area, the wireless frequency channels, the device admission policy, coordination with other neighboring wireless networks etc. and usually also act as a gateway to the backend infrastructure network. Examples of the central controllers are base stations or eNBs in cellular wireless networks or APs (Access Points) in WLANs (Wireless Local Area Networks).

Even though the techniques described in the present disclosure may apply to many wireless communication systems, for the sake of example, the rest of the descriptions in this disclosure are described in terms of an IEEE 802.11 based WLAN system and its associated terminologies. This should not be taken as limiting the present disclosure with regard to alternative wireless communication systems. In IEEE 802.11 based WLANs, majority of networks operate in infrastructure mode, i.e., all or most of the traffic in the network need to go through the AP. As such, any STA (station) wishing to join the WLAN must first negotiate the network membership with the AP through a process called association and authentication.

Figure 1:
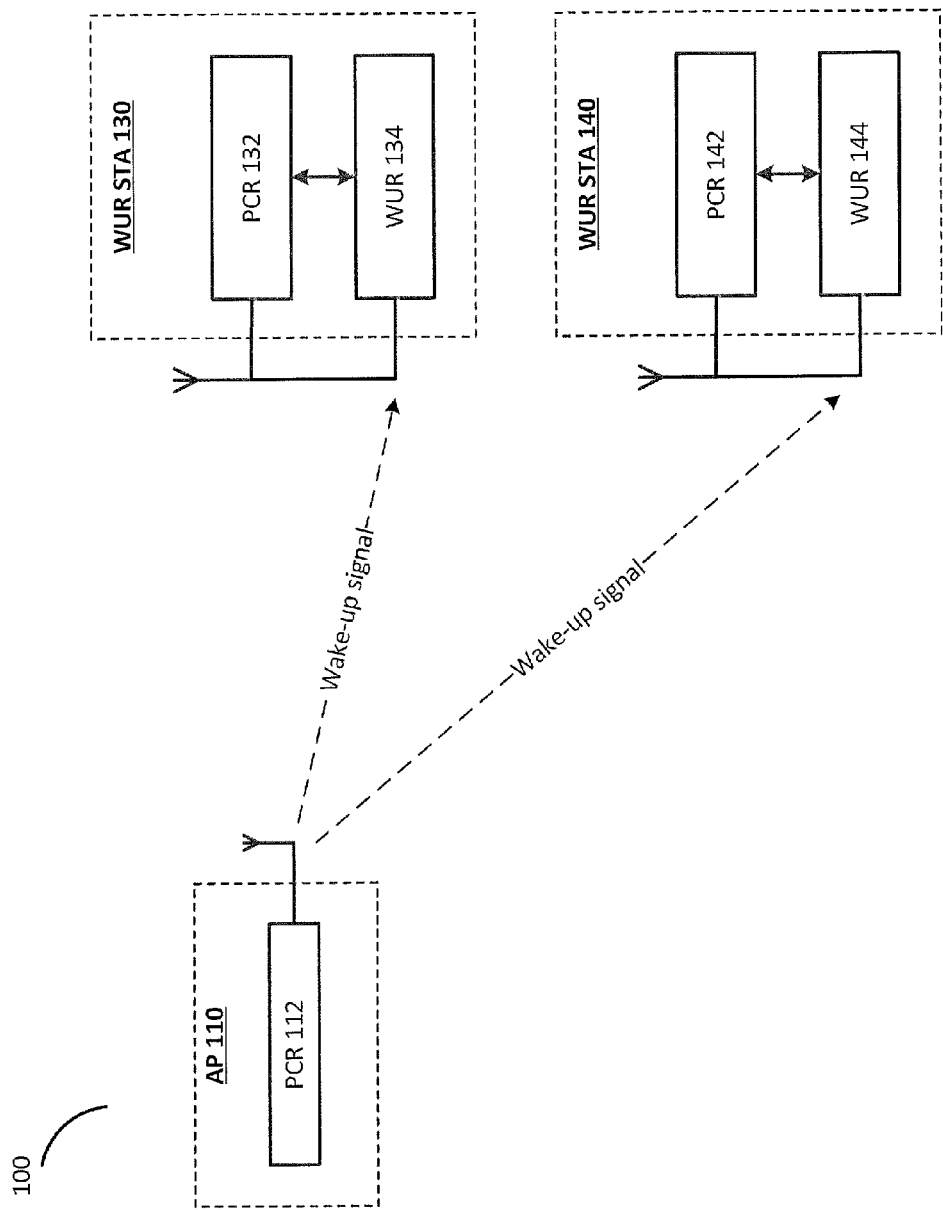
FIG. 1 is a diagram illustrating an example wireless network.

FIG. 1 illustrates an example wireless network 100 including an AP 110 and a plurality of STAs. The AP 110 includes a PCR apparatus (hereinafter stated simply as "PCR") 112. STA 130 represents a device class that may have less bandwidth requirements and also less stringent QoS requirements but may be relatively more concerned about power consumption. STA 140 represents another class of devices that may have low bandwidth requirements but may be very sensitive to power consumption. In order to maximise energy efficiency, the STA 130 is equipped with a WUR apparatus 134 (hereinafter stated simply as "WUR") in addition to a PCR 132 and the STA 140 is equipped with a WUR 144 in addition to a PCR 142. Both the STA 130 and the STA 140 are termed as WUR STAs thereafter.

According to the present disclosure, a WUR STA can operate in either of the two power management modes: active mode and PS (power save) mode. When the STA operates in PS mode, it is in either awake state or doze state. For the STA operating in PS mode, it is in awake state when its PCR is active and thus is able to receive DL (downlink) traffic or transmit UL (uplink) traffic; and it is in doze state when its PCR is not active and thus is not able to transmit UL traffic or receive DL traffic. When the STA operates in active mode, it is always in awake state.

According to the present disclosure, a WUR STA operating in active mode or PS mode can also operate in WUR mode. When the STA operates in both PS mode and WUR mode, it is in either WUR awake state or WUR doze state. For the STA operating in both PS mode and WUR mode, it is in WUR awake state when its PCR is active and its WUR may not be active; and it is in WUR doze state when its PCR is not active and its WUR receiver follows the duty cycle schedule agreed between the AP 110 and the STA. When the STA operates in both active mode and WUR mode, it is always in WUR awake state.

According to the present disclosure, a duty cycle schedule is represented by three parameters: the starting point for the duty cycle schedule, the period of duty cycle, and the on duration in each duty cycle period. The period of duty cycle is a multiple of a WUR basic unit. The on duration in each duty cycle period is larger than or equal to a minimum WUR on duration, which is a minimum value of WUR on duration indicated by the AP 110. Notice that for the STA being in WUR doze state, when the on duration in each duty cycle period is equal to the period of duty cycle, its WUR receiver is always on.

According to the present disclosure, the WUR basic unit can be a multiple of time unit (1024 us) defined in the IEEE Std 802.11™-2016. As a result, the implementation of a WUR STA can be simplified.

According to the present disclosure, the AP 110 shall keep track of the status of the STA operating in WUR mode. In other words, the AP 110 shall record whether the STA operating in WUR mode is in WUR awake state or WUR doze state.

According to the present disclosure, when DL data traffic for the STA in WUR doze state is coming, the AP 110 shall buffer DL data traffic for the STA and then transmit a wake-up frame to the STA, alerting there is buffered DL data traffic for the STA.

Figure 10:
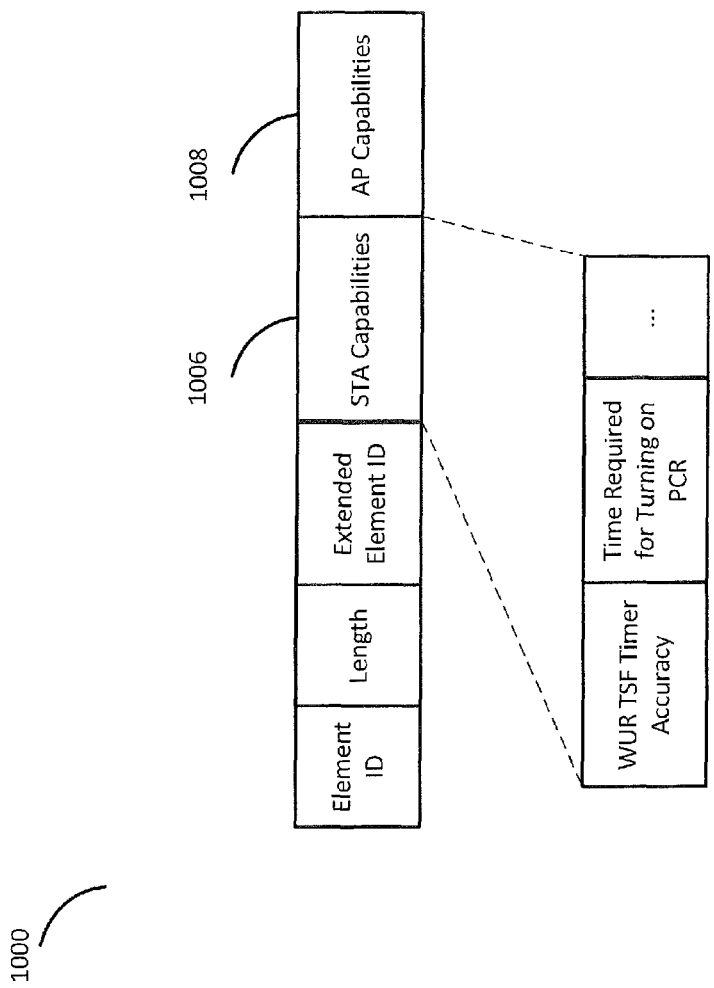
FIG. 10 is a diagram illustrating an example format of WUR Capabilities element according to the present disclosure.

According to the present disclosure, WUR mode operation is governed by wake-up operating parameters which are classified into two categories: configurable wake-up operating parameters and nonconfigurable wake-up operating parameters. Example configurable wake-up operating parameters include
  WUR Beacon interval
  WUR operating channel in which the STA's WUR receiver is able to receive WUR frame (i.e., WUR Beacon frame or wake-up frame),
  WUR identifier (WID) which is used in a unicast wake-up frame to identify the intended STA, and
  duty cycle schedule of the STA's WUR receiver
Example nonconfigurable wake-up operating parameters include
  WUR basic unit,
  minimum WUR on duration,
  time required for turning on the STA's PCR, and
  support of frequency domain multiplexing transmission for multiple wake-up frames According to the present disclosure, nonconfigurable wake-up operating parameters can be carried in a WUR Capabilities element, as illustrated in FIG. 10. The WUR Capabilities element can be included in a Beacon frame, an Association Request/Response frame, an Reassociation Reqeust/Response frame, or a Probe Request/Response frame. The formats of the Beacon frame, the Association Request/Response frame, the Reassociation Request/Response frame and the Probe Request/Response frame are defined in the IEEE Std 802.11™-2016.

Figure 7:
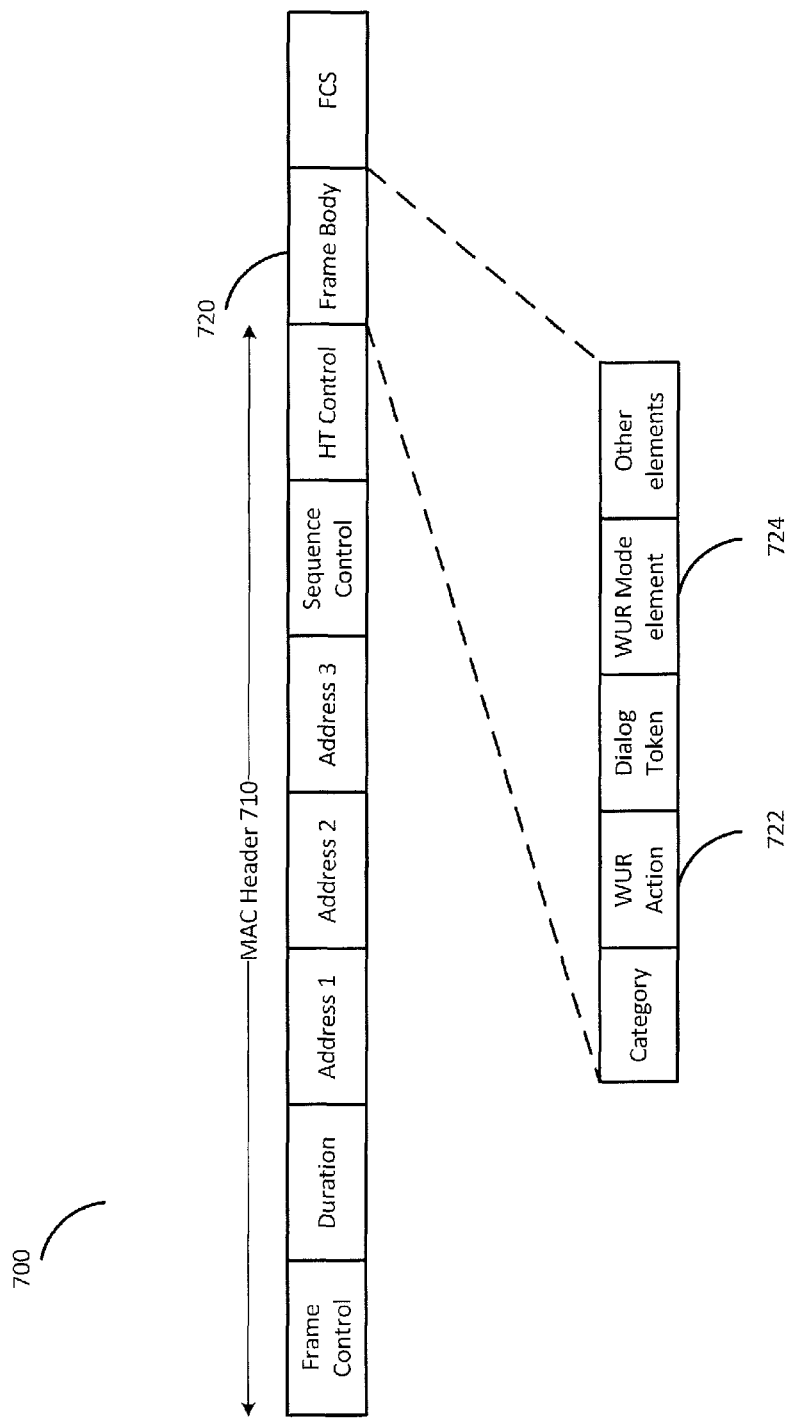
FIG. 7 is a diagram illustrating an example format of WUR Action frame according to the present disclosure.
Figure 8:
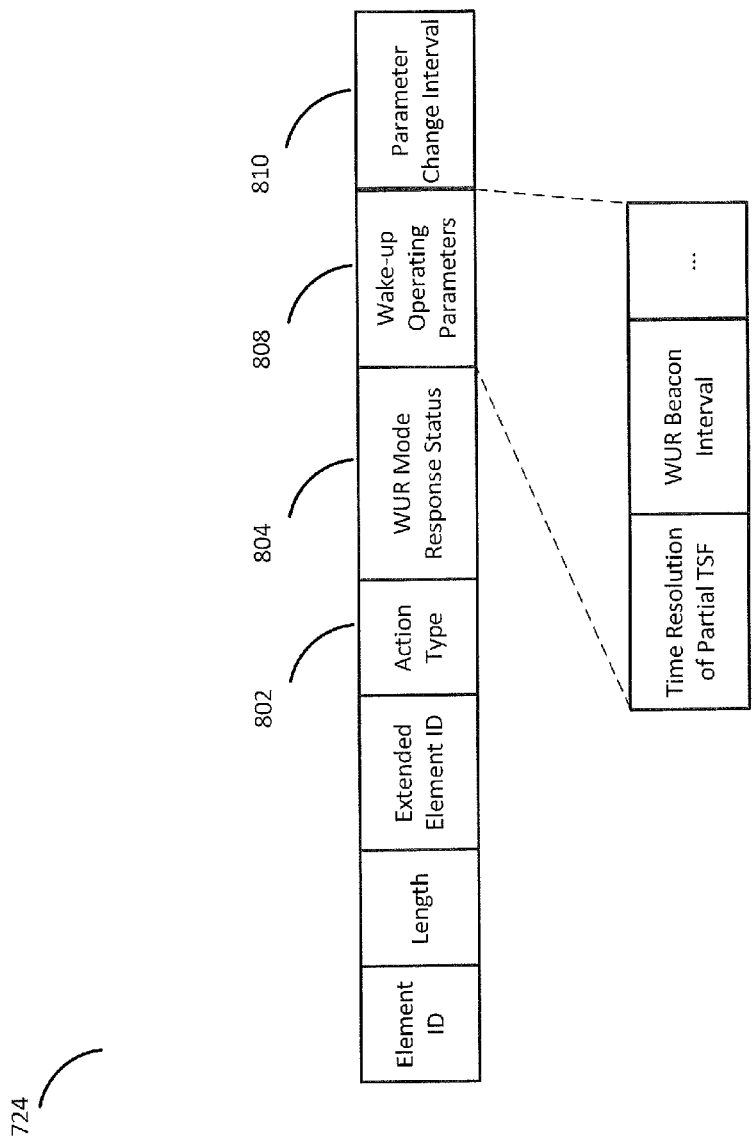
FIG. 8 is a diagram illustrating an example format of WUR Mode element according to the present disclosure.

According to the present disclosure, configurable wake-up operating parameters can be carried in a WUR Mode element 724, as illustrated in FIG. 8. The WUR Mode element 724 can be included in a WUR Action frame 700 as illustrated in FIG. 7 (e.g., WUR Mode Request frame or WUR Mode Response frame), an Association Request/Response frame or a Reassociation Request/Response frame.

According to the present disclosure, nonconfigurable wake-up operating parameters are exchanged between the STA and the AP 110 via a synchronization procedure and/or an association procedure. Configurable wake-up operating parameters are negotiated between the STA and the AP 110 via a WUR negotiation procedure, an integrated WUR negotiation and WUR mode entry procedure, or an association procedure incorporating WUR negotiation. In doing so, channel efficiency is maximized since nonconfigurable wake-up operating parameters do not changed.

Figure 2:
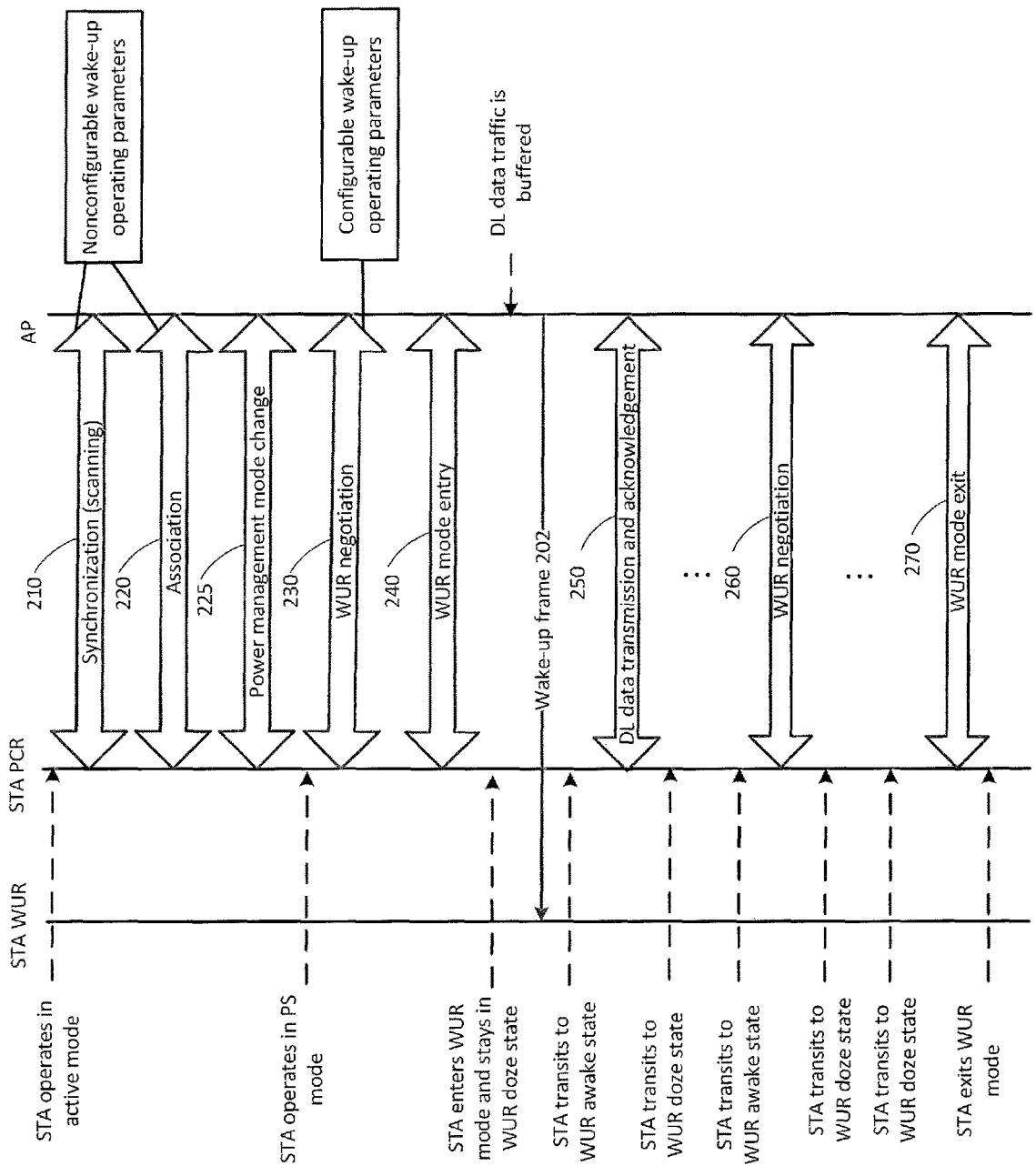
FIG. 2 is a diagram illustrating a first example of WUR mode operation related MAC procedures according to the present disclosure.

FIG. 2 illustrates a first example of WUR mode operation related MAC procedures operated by a WUR STA and the AP 110 according to the present disclosure. Before the STA is associated with the AP 110, it operates in active mode and initiates a synchronization procedure 210 to acquire synchronization with the AP 110 via passive scanning or active scanning. During the synchronization procedure 210, if active scanning is performed, the STA sends a Probe Request frame to the AP 110. The AP 110 responds with a Probe Response frame which contains nonconfigurable wake-up operating parameters specific to the AP 110 (e.g., minimum WUR on duration) as well as necessary system and synchronization information (e.g., TSF (Time Synchronization Function) timer). If passive scanning is performed, the STA receives a Beacon frame from the AP 110 which contains nonconfigurable wake-up operating parameters specific to the AP 110 as well as necessary system and synchronization information.

After the STA gets synchronized with the AP 110 via the synchronization procedure 210, it may initiate an association procedure 220 with the AP 110. During the association procedure 220, the STA sends an Association Request frame or a Reassociation Request frame to the AP 110, which contains nonconfigurable wake-up operating parameters specific to the STA. The AP 110 responds with an Association Response frame or a Reassociation Response frame.

The STA may initiate a power management mode change procedure 225 for changing its power management mode to PS mode after it is associated with the AP 110 via the association procedure 220 with the AP 110. During the power management mode change procedure 225, the STA may transmit a QoS Null frame with the Power Management subfield set to 1 to the AP 110; and the AP 110 will respond with an ACK frame. After receiving the ACK frame, the STA transits to operate in PS mode. After that, the STA may initiate a WUR negotiation procedure 230 with the AP 110 to negotiate configurable wake-up operating parameters. During the WUR negotiation procedure 230, the STA sends a WUR Mode Request frame to the AP 110 which contains requested configurable wake-up operating parameters, and then the AP 110 responds with a WUR Mode Response frame which contains agreed configurable wake-up operating parameters. After completing configurable wake-up operating parameter negotiation, the STA may initiate a WUR mode entry procedure 240 with the AP 110. During the WUR mode entry procedure 240, the STA transmit a WUR Mode Request frame to the AP 110 with a request for entering WUR mode, and then the AP 110 responds with a WUR Mode Response frame which indicates whether the STA's request for entering WUR mode is accepted or rejected. After receiving the WUR Mode Response frame indicating the request for entering WUR mode is accepted, the STA enters WUR mode and stays in WUR doze state.

Alternatively, instead of separate WUR negotiation procedure 230 and WUR mode entry procedure 240, the STA may initiate an integrated WUR negotiation and WUR mode entry procedure with the AP 110 for negotiating configurable wake-up operating parameters and requesting to enter WUR mode. During the integrated WUR negotiation and WUR mode entry procedure, the STA sends a WUR Mode Request frame to the AP 110 which contains requested configurable wake-up operating parameters and a request for entering WUR mode, and then the AP 110 responds with a WUR Mode Response frame which contains agreed configurable wake-up operating parameters and indicates whether the STA's request for entering WUR mode is accepted or rejected. After receiving the WUR Mode Response frame indicating the request for entering WUR mode is accepted, the STA enters WUR mode and stays in WUR doze state. Notice that the integrated WUR negotiation and WUR mode entry procedure implements the same functionality as the WUR negotiation procedure 230 and the WUR mode entry procedure 240. As a result, the integrated WUR negotiation and WUR mode entry procedure results in better channel efficiency than the WUR negotiation procedure 230 and the WUR mode entry procedure 240.

According to the present disclosure, according to the duty cycle schedule of its WUR receiver agreed between the STA and the AP 110, the STA staying in WUR doze state turns on its WUR receiver periodically to attempt reception of WUR frame, e.g., WUR Beacon frame that is transmitted by the AP 110 periodically in order to keep the STA's WUR receiver synchronized with the AP 110.

According to the present disclosure, when the WUR receiver of the STA staying in WUR doze state receives a unicast wake-up frame 202 from the AP 110, it transits to WUR awake state as shown in FIG. 2, and then initiates a DL data transmission and acknowledgement procedure 250 with the AP 110. During the DL data transmission and acknowledgement procedure 250, it may transmit a PS-Poll frame to the AP 110 via its PCR to retrieve buffered traffic and acknowledge successful receipt of the wake-up frame 202. The AP 110 responds to the PS-Poll frame with a buffered Data frame or an ACK frame followed in a separate TXOP by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame for acknowledging successful receipt of the Data frame. The acknoweldgement frame is either an ACK frame or a Block-Ack frame. After transmitting the acknowledgement frame which acknowledges successful receipt of the Data frame with the More Data field set to 0, the STA transits to WUR doze state.

According to the present disclosure, the STA may transit to WUR awake state from WUR doze state even if no wake-up frame is received or no UL data traffic is buffered. For one example, when the STA intends to negotiate new configurable wake-up operating parameters (e.g., duty cycle schedule of its WUR receiver) with the AP 110, it transits to WUR awake state from WUR doze state and initiates another WUR negotiation procedure 260 with the AP 110. During the WUR negotiation procedure 260, the STA sends a WUR Mode Request frame to the AP 110 which contains requested configurable wake-up operating parameters, and then the AP 110 responds with a WUR Mode Response frame which contains agreed configurable wake-up operating parameters and indicates when the agreed configurable wake-up operating parameters will take effect. After completing new configurable wake-up operating parameter negotiation, the STA transits to WUR doze state. For another example, when the STA intends to exit WUR mode, it transits to WUR awake state from WUR doze state and initiates a WUR mode exit procedure 270 with the AP 110. During the WUR mode exit procedure 270, the STA sends a WUR Mode Request frame to the AP 110 with a request for exiting WUR mode, and then the AP 110 responds with a WUR Mode Response frame which indicates whether the STA's request for exiting WUR mode is accepted or rejected. After receiving the WUR Mode Response frame indicating the request for exiting WUR mode is accepted, the STA exits WUR mode and operates in PS mode only.

According to the present disclosure, the STA operating in WUR mode is allowed to initiate a WUR negotiation procedure with the AP 110 to negotiate new configurable wake-up operating parameters as illustrated in FIG. 2, with no need of exiting WUR mode. As a result, channel efficiency is maximized.

Figure 11:
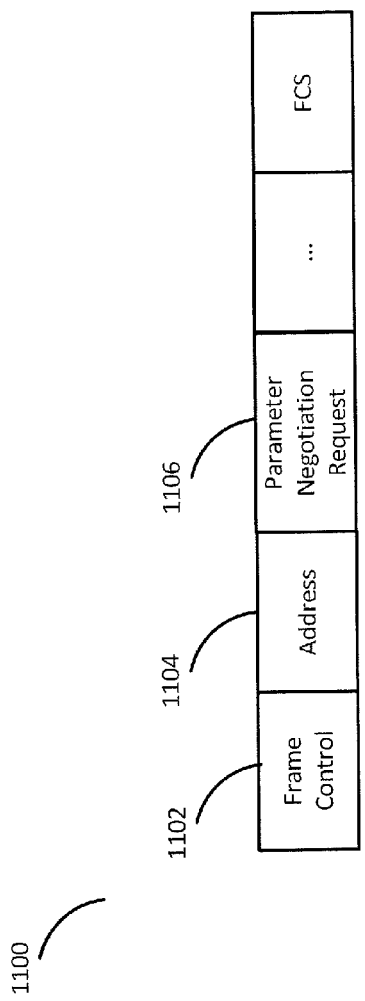
FIG. 11 is a diagram illustrating an example format of wake-up frame according to the present disclosure.

According to the present disclosure, if the AP 110 intends to negotiate new configurable wake-up operating parameters with the STA operating in WUR mode, it sends a wake-up frame to inform the STA operating in WUR mode that it intends to negotiate new configurable wake-up operating parameters, as illustrated in FIG. 11. After receiving such a wake-up frame, the STA operating in WUR mode initiates a WUR negotiation procedure with the AP 110 to negotiate new configurable wake-up operating parameters, with no need of exiting WUR mode. As a result, channelefficiency is maximized.

Figure 3:
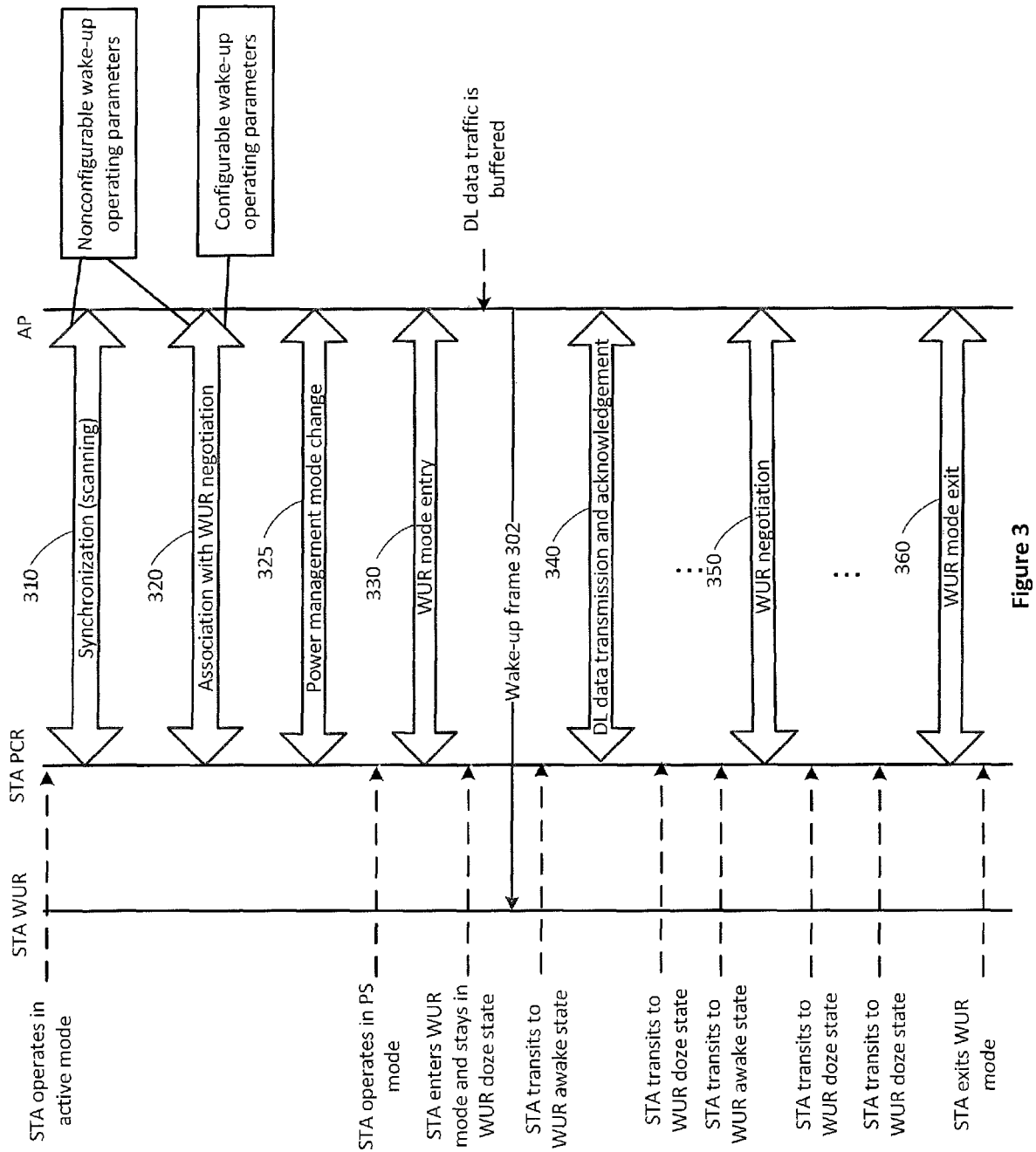
FIG. 3 is a diagram illustrating a second example of WUR mode operation related MAC procedures according to the present disclosure.

FIG. 3 illustrates a second example of WUR mode operation related MAC procedures operated by a WUR STA and the AP 110 according to the present disclosure. Before the STA is associated with the AP 110, it operates in active mode and initiate a synchronization procedure 310 to acquire synchronization with the AP 110 via passive scanning or active scanning. During the synchronization procedure 310, if active scanning is performed, the STA sends a Probe Request frame to the AP 110. The AP 110 responds with a Probe Response frame which contains nonconfigurable wake-up operating parameters specific to the AP 110 (e.g., minimum WUR on duration) as well as necessary system and synchronization information (e.g., TSF timer). If passive scanning is performed, the STA receives a Beacon frame from the AP 110 which contains nonconfigurable wake-up operating parameters specific to the AP 110 as well as necessary system and synchronization information.

After the STA gets synchronized with the AP 110 via the synchronization procedure 310, it may initiate an association procedure 320 with the AP 110, which incorporates WUR negotiation. During the association procedure 320, the STA sends an Association Request frame or a Reassociation Request frame to the AP 110, which contains nonconfigurable wake-up operating parameters specific to the STA as well as requested configurable wake-up operating parameters. And then the AP 110 responds with an Association Response frame or a Reassociation Response frame, which contains agreed configurable wake-up operating parameters. Notice that the association procedure 320 results in better channel efficiency since it implements the same functionality as the association procedure 220 and the WUR negotiation procedure 230 as illustrated in FIG. 2.

The STA may initiate a power management mode change procedure 325 for changing its power management mode to PS mode after it is associated with the AP 110 via the association procedure 320 with the AP 110. During the power management mode change procedure 325, the STA may transmit a QoS Null frame with the Power Management subfield set to 1 to the AP 110; and the AP 110 will respond with an ACK frame. After receiving the ACK frame, the STA transits to operate in PS mode. After that, the STA may initiate a WUR mode entry procedure 330 with the AP 110. During the WUR mode entry procedure 330, the STA transmit a WUR Mode Request frame to the AP 110 with a request for entering WUR mode, and then the AP 110 responds with a WUR Mode Response frame which indicates whether the STA's request for entering WUR mode is accepted or rejected. After receiving the WUR Mode Response frame indicating the request for entering WUR mode is accepted, the STA enters WUR mode and stays in WUR doze state.

According to the present disclosure, according to the duty cycle schedule of its WUR receiver agreed between the STA and the AP 110, the STA staying in WUR doze state turns on its WUR receiver periodically to attempt reception of WUR frame, e.g., WUR Beacon frame that is transmitted by the AP 110 periodically in order to keep the STA's WUR receiver synchronized with the AP 110.

According to the present disclosure, when the WUR of the STA staying in WUR doze state receives a unicast wake-up frame 302 from the AP 110, it transits to WUR awake state as shown in FIG. 3, and then initiates a DL data transmission and acknowledgement procedure 340 with the AP 110. During the DL data transmission and acknowledgement procedure 340, it may transmit a PS-Poll frame to the AP 110 via its PCR to retrieve buffered traffic and acknowledge successful receipt of the wake-up frame 302. The AP 110 responds to the PS-Poll frame with a buffered Data frame or an ACK frame followed in a separate TXOP by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame for acknowledging successful receipt of the Data frame. The acknoweldgement frame is either an ACK frame or a BlockAck frame. After transmitting the acknowledgement frame which acknowledges successful receipt of the Data frame with the More Data field set to 0, the STA transits to WUR doze state.

According to the present disclosure, the STA may transit to WUR awake state from WUR doze state even if no wake-up frame is received or no UL data traffic is buffered. For one example, when the STA intends to negotiate new configurable wake-up operating parameters (e.g., duty cycle schedule of its WUR receiver) with the AP 110, it transits to WUR awake state from WUR doze state and initiates a WUR negotiation procedure 350 with the AP 110. During the WUR negotiation procedure 350, the STA sends a WUR Mode Request frame to the AP 110 which contains requested configurable wake-up operating parameters, and then the AP 110 responds with a WUR Mode Response frame which contains agreed configurable wake-up operating parameters. After receiving the WUR Mode Response frame, the STA transits to WUR doze state. For another example, when the STA intends to exit WUR mode, it transits to WUR awake state from WUR doze state and initiates a WUR mode exit procedure 360 with the AP 110. During the WUR mode exit procedure 360, the STA sends a WUR Mode Request frame to the AP 110 with a request for exiting WUR mode, and then the AP 110 responds with a WUR Mode Response frame which indicates whether the STA's request for exiting WUR mode is accepted or rejected. After receiving the WUR Mode Response frame indicating the request for exiting WUR mode is accepted, the STA exits WUR mode and operates in PS mode only.

According to the present disclosure, the STA operating in WUR mode is allowed to initiate a WUR negotiation procedure with the AP 110 to negotiate new configurable wake-up operating parameters as illustrated in FIG. 3, with no need of exiting WUR mode. As a result, channel efficiency is maximized.

According to the present disclosure, if the AP 110 intends to negotiate new configurable wake-up operating parameters with the STA operating in WUR mode, it sends a wake-up frame to inform the STA operating in WUR mode that it intends to negotiate new configurable wake-up operating parameters, as illustrated in FIG. 11. After receiving such a wake-up frame, the STA operating in WUR mode initiates a WUR negotiation procedure with the AP 110 to negotiate new configurable wake-up operating parameters, with no need of exiting WUR mode. As a result, channel efficiency is maximized.

Figure 4:
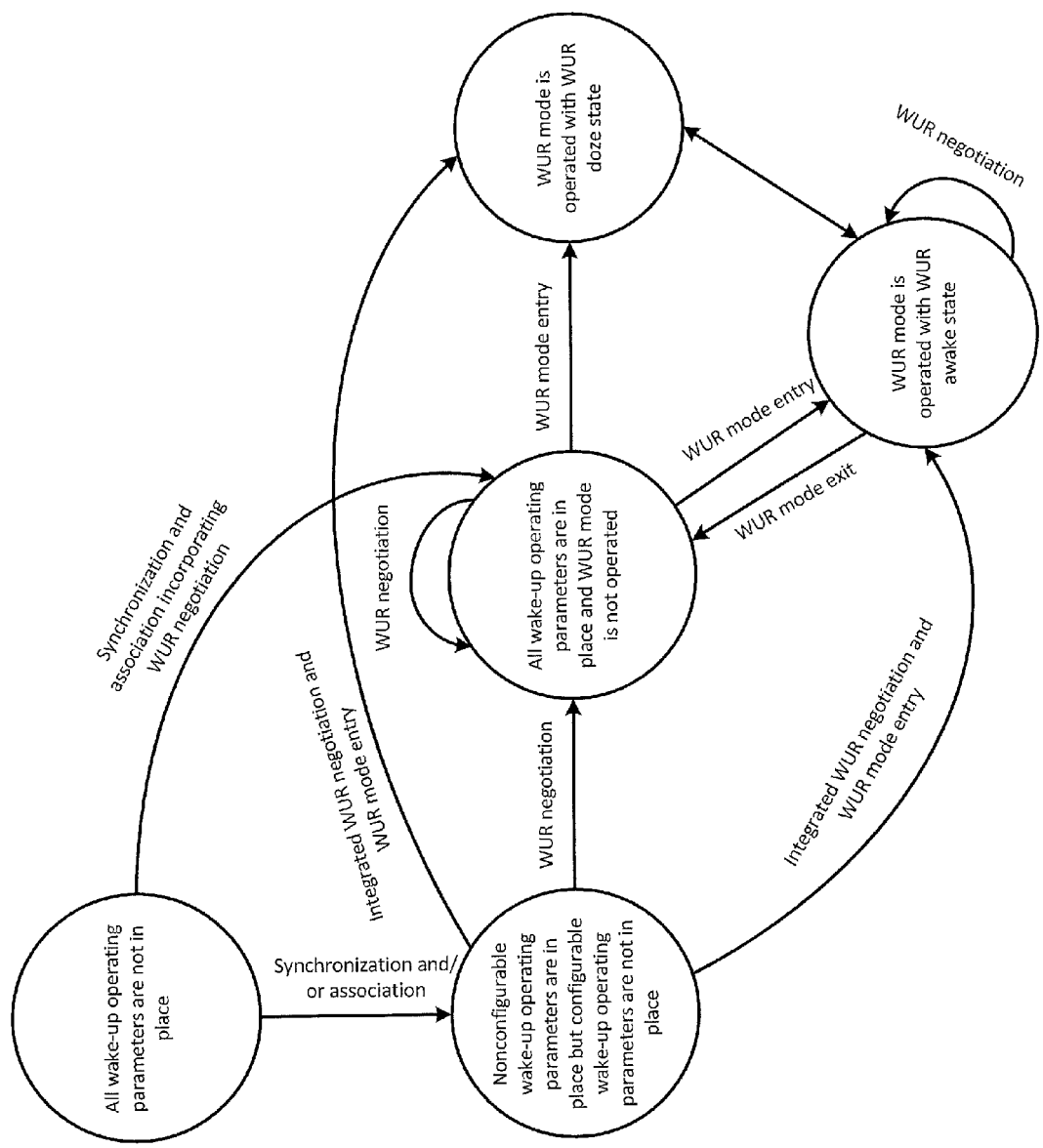
FIG. 4 is a diagram illustrating WUR mode operation related state transition for a wireless communication device according to the present disclosure.

FIG. 4 illustrates WUR mode operation related state transition for the STA according to the present disclosure. The STA has five states related to WUR mode operation. In a first state, all wake-up operating parameters are not in place. In a second state, nonconfigurable wake-up operating parameters are in place but configurable wake-up operating parameters are not in place. In a third state, all wake-up operating parameters are in place and WUR mode is not operated. In a fourth state, WUR mode is operated with WUR doze state. In a fifth state, WUR mode is operated with WUR awake state. As illustrated in FIG. 4, the STA staying in the first state can transit to the second state after a synchronization procedure and/or an association procedure is completed, or transit to the third state after a synchronization procedure and an association procedure incorporating WUR negotiation is completed. The STA staying in the second state can transit to the third state after a WUR negotiation procedure is completed, transit to the fourth state after an integrated WUR negotiation and WUR mode entry procedure is completed and if the STA also operates in PS mode, or transit to the fifth state after an integrated WUR negotiation and WUR mode entry procedure is completed and if the STA also operates in active mode. The STA staying in the third state can transit to the fourth state after a WUR mode entry procedure is completed and if the STA also operates in PS mode, transit to the fifth state after a WUR mode entry procedure is completed and if the STA also operates in active mode, or update configurable wake-up operating parameters after a WUR negotiation procedure is completed. The STA staying in the fourth state can transit to the fifth state for various reasons, e.g., when UL data traffic is buffered, or when a wake-up frame is received. The STA staying in the fifth state can transit to the third state after a WUR mode exit procedure is completed, or update configurable wake-up operating parameters after a WUR negotiation procedure is completed. The STA staying in the fifth state can transit to the fourth state for various reasons, e.g., after acknowledging a DL Data frame with the More Data field set to 0 or receiving an acknowledgement frame which acknowledges an UL Data frame with the More Data field set to 0.

Figure 6A:
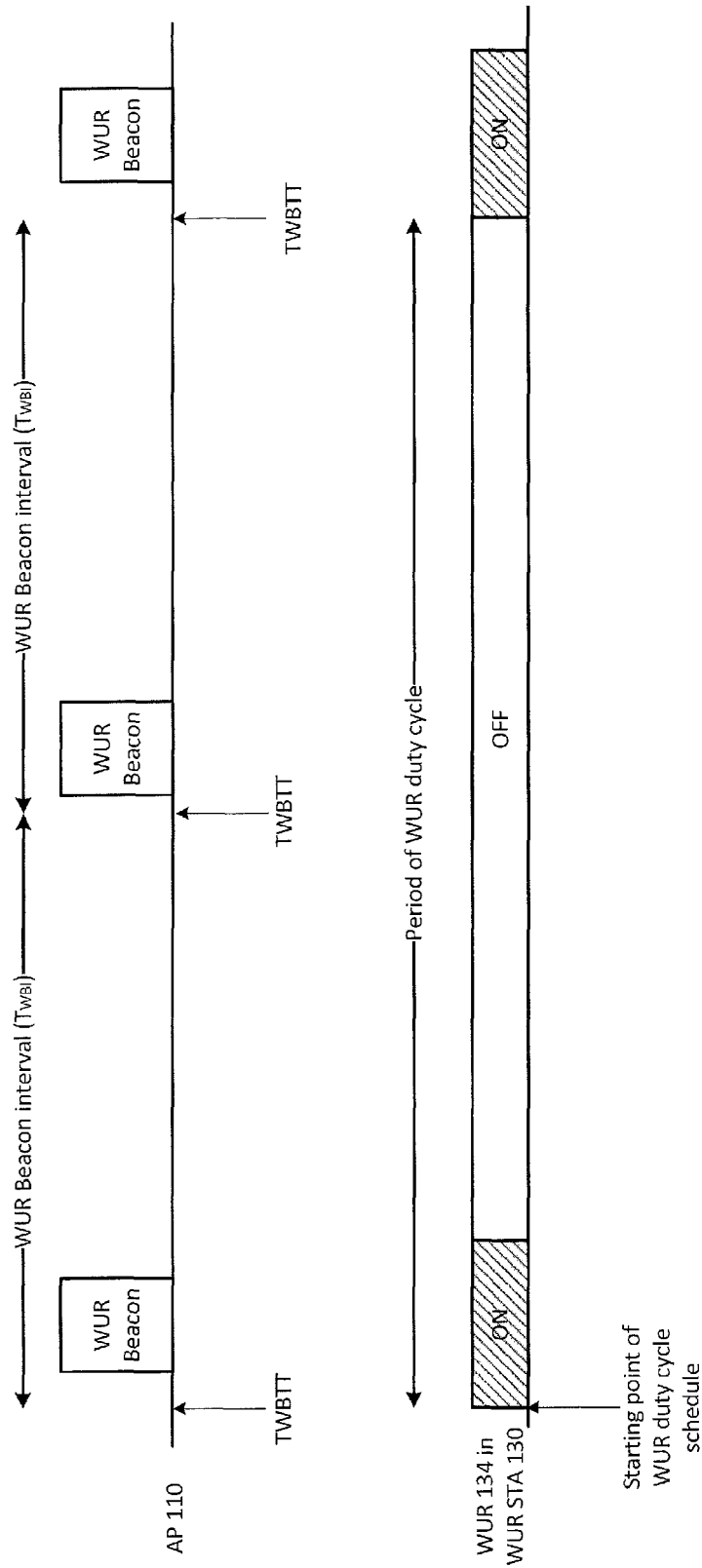
FIG. 6A is a diagram illustrating a first example of the relationship between WUR duty cycle schedule and WUR Beacon transmission according to the present disclosure.
Figure 6B:
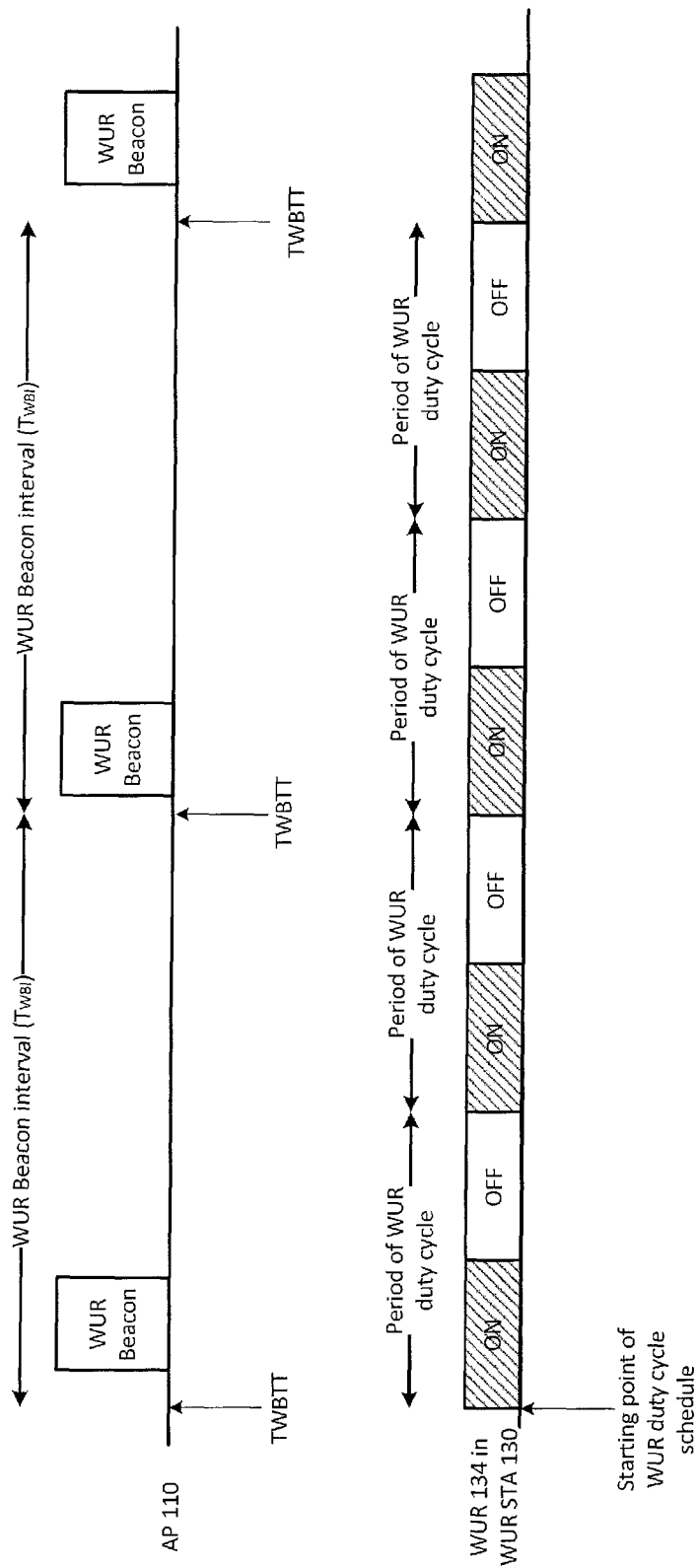
FIG. 6B is a diagram illustrating a second example of the relationship between WUR duty cycle schedule and WUR Beacon transmission according to the present disclosure.

According to the present disclosure, the duty cycle schedule of the STA's WUR receiver shall satisfy the following requirements:

The starting point of the duty cycle schedule is aligned with TWBTT (Target WUR Beacon Transmission Time) as illustrated in FIG. 6A or 6B; and The period of the duty cycle schedule is either a multiple of the WUR Beacon interval $T_{WBI}$ as illustrated in FIG. 6A or a fraction of the WUR Beacon interval $T_{WBI}$ as illustrated in FIG. 6B.

As a result, the WUR receiver of the STA staying in WUR doze state is able to turn on in appropriate time to receive WUR Beacon frame for keeping synchronized with the AP 110. The starting point of the duty cycle schedule may be exactly at the same time instant of a TWBTT, or may precede the TWBTT with a small time offset so that the STA's WUR receiver can receive a short frame (e.g., unicast wake-up frame) within the time offset. The time offset may have a predetermined duration. Alternatively, the duration of the time offset may be negotiated between the AP 110 and the STA during a WUR negotiation procedure and may vary among different STAs.

Figure 6C:
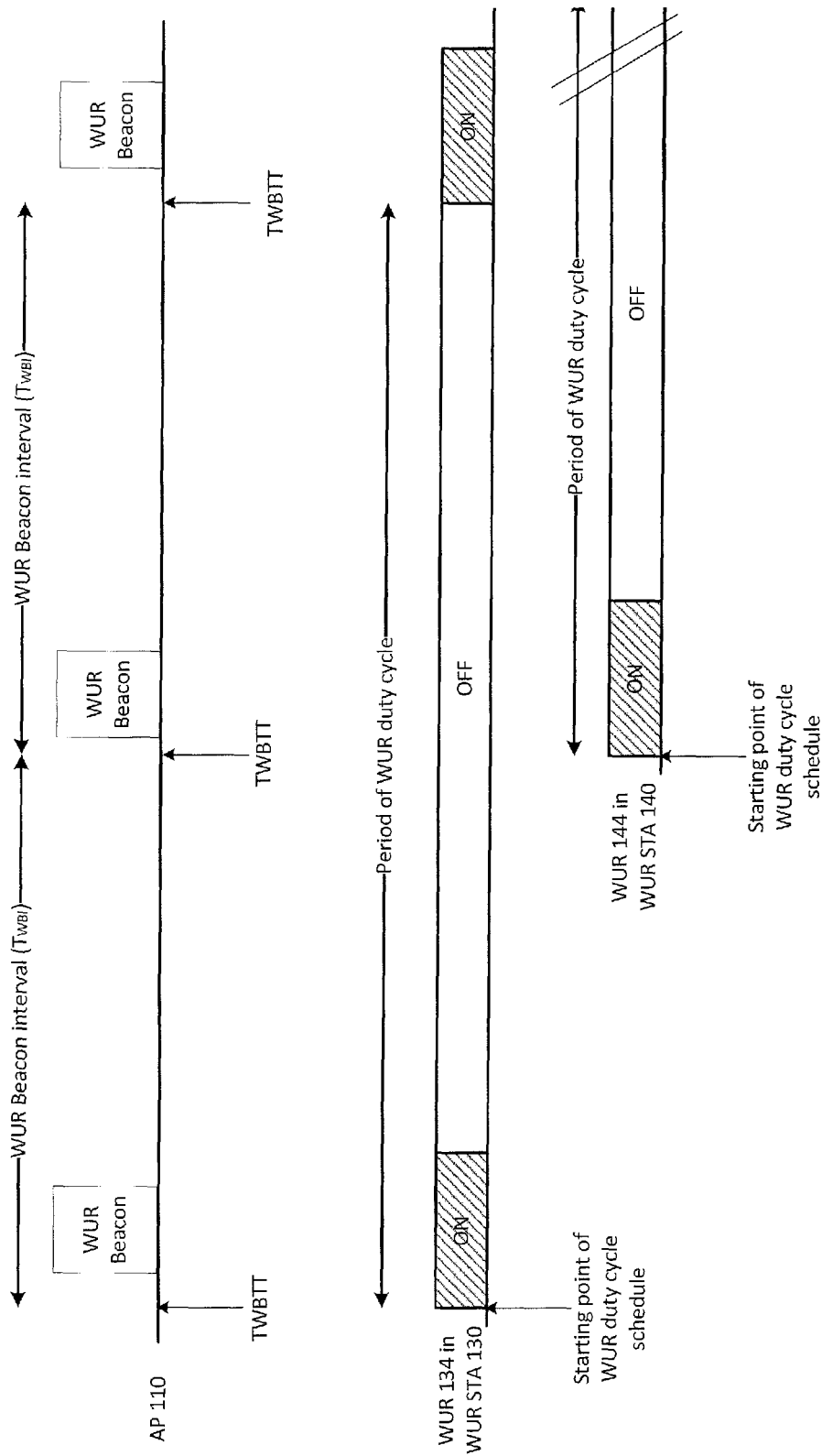
FIG. 6C is a diagram illustrating a third example of the relationship between WUR duty cycle schedule and WUR Beacon transmission according to the present disclosure.

According to the present disclosure, the AP 110 may specify different starting points of the duty cycle schedule for different STAs which have the same period of WUR duty cycle so that the two STAs'WUR on durations do not overlap each other, as illustrated in FIG. 6C.

Figure 6D:
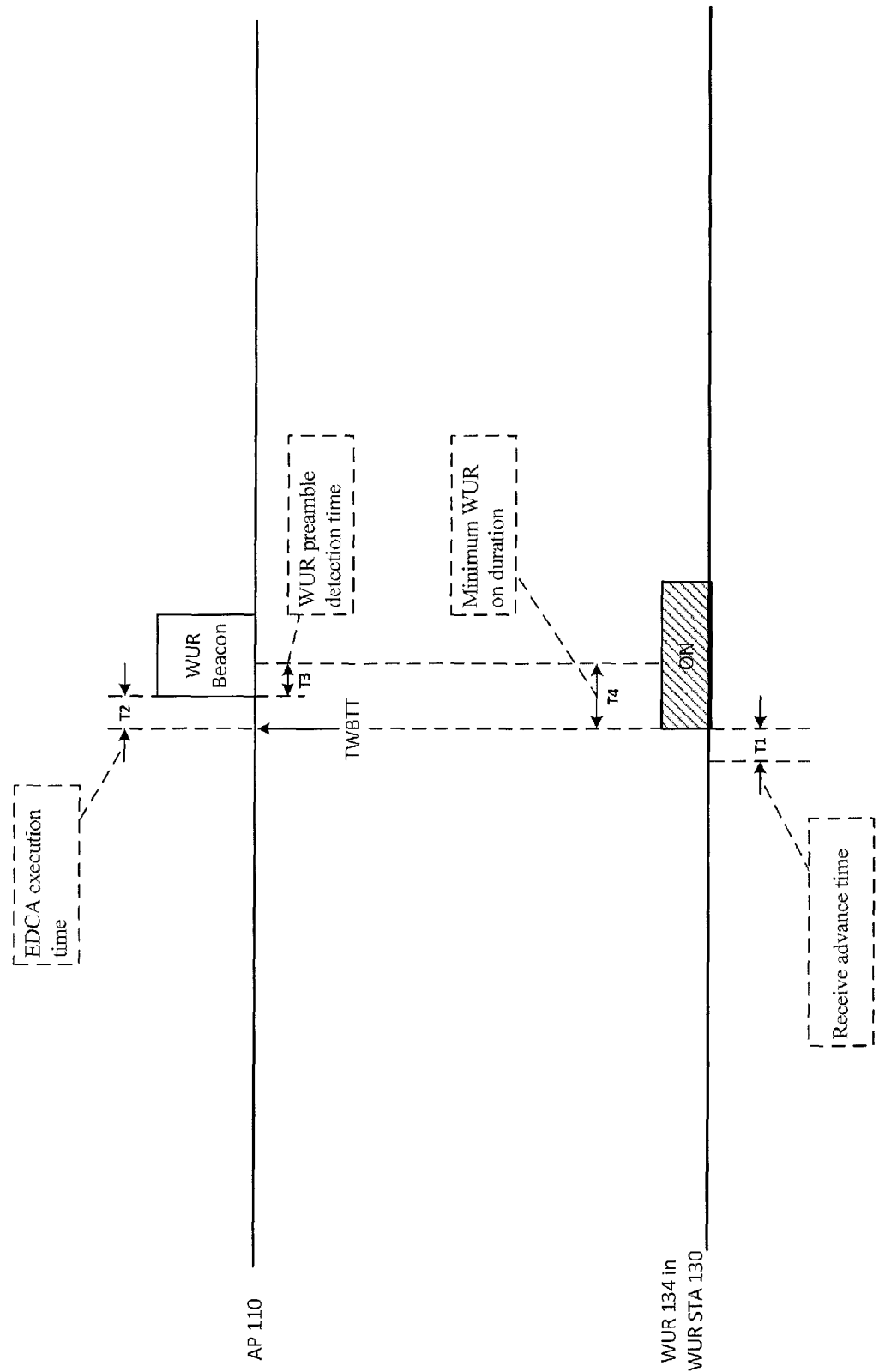
FIG. 6D is a diagram illustrating a fourth example of the relationship between WUR duty cycle schedule and WUR Beacon transmission according to the present disclosure.

According to the present disclosure, as illustrated in FIG. 6D, the STA may turn on its WUR a bit earlier than the starting time instant of a WUR on duration to absorb drifts at both the AP 110 and the STA due to clock inaccuracry. The duration between the time instant when the STA turns on its WUR and the starting time instant of the WUR on duration is called receive advance time (T1).

According to the present disclosure, as illustrated in FIG. 6D, the AP 110 may not be able to transmit a WUR Beacon frame exactly at the TWBTT. This is because the AP 110 cannot transmit the WUR Beacon frame until it gets a transmit opportunity using EDCA (Enhanced Distributed Channel Access). The duration between the TWBTT and the time instant when the AP 110 transmits the WUR Beacon frame is called EDCA execution time (T2).

Figure 12:
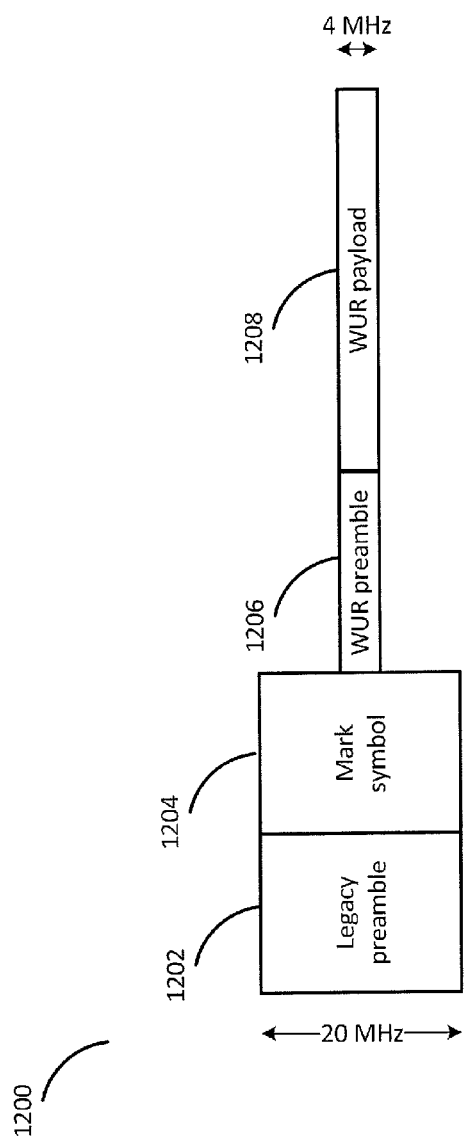
FIG. 12 is a diagram illustrating an example format of WUR PPDU (physical layer protocol data unit) according to the present disclosure.

According to the present disclosure, as illustrated in FIG. 12, a WUR PPDU containing a WUR Beacon frame comprises a WUR preamble, which is used by a WUR receiver to perform time synchronization and packet detection. The time required by the WUR receiver for detecting the WUR preamble is called WUR preamble detection time (T3), as illustrated in FIG. 6D.

According to the present disclosure, as illustrated in FIG. 6D, the minimum WUR on duration (T4) shall be not smaller than the EDCA execution time (T2) plus the WUR preamble detection time (T3).

Figure 5:
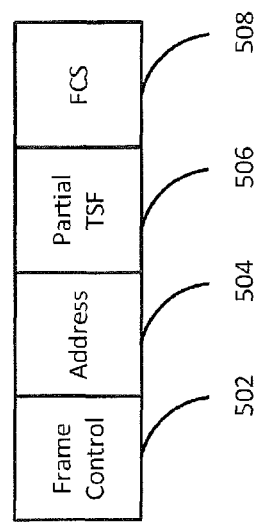
FIG. 5 is a diagram illustrating an example format of WUR Beacon frame according to the present disclosure.

FIG. 5 illustrates an example format of WUR Beacon frame 500. The WUR Beacon frame 500 comprises a Frame Control field 502, an Address field 504, a Partial TSF field 506 and a FCS (Frame Check Sequence) field 508. The Frame Control field 502 has a fixed size (e.g., 8 bits) and comprises a Type subfield which identifies the WUR frame type (e.g., WUR Beacon frame, unicast wake-up frame or multicast wake-up frame). The Address field 504 has a fixed size (e.g., 12 bits) and contains an identifier of the AP 110. The Partial TSF field 506 has a fixed size (e.g., 12 bits) timestamp and contains a part of the 64-bit TSF timer value at a certain time instant during the transmission of the WUR Beacon frame 500, for example, the start time of transmitting the symbol which includes the first bit of the Partial TSF field 506 of the WUR Beacon frame 500. The maximum correctable drift due to the Partial TSF field 506 is

[Math.1]

$$d_{max} = \pm 2^{(L_{pt}-1)} \times D_{pt}, \quad (1)$$

where $L_{pt}$ is the size of the Partial TSF field 506 and $D_{pt}$ is the time resolution of the Partial TSF field 506. The FCS field 508 has a fixed size as well (e.g., 16 bits). In other words, a WUR Beacon frame has a size of about 48 bits. Considering PHY overhead such as legacy preamble and WUR preamble and low data rate 62.5 kbps used to transmit WUR Beacon frame, the transmission time required for a WUR Beacon frame is typically 920 us, which is not insignificant.

According to the present disclosure, the WUR Beacon interval $T_{WBI}$ is configurable, e.g., 1 s, 2 s, 4 s, 6 s, 8 s or 10 s, which is indicated in the WUR Mode element 724 as illustrated in FIG. 8. Various embodiments of configuring the WUR Beacon interval $T_{WBI}$ by the AP 110 are described below.

FIRST EMBODIMENT

According to a first embodiment of the present disclosure, the time resolution $D_{pt}$ of the Partial TSF field 506 is fixed (e.g., 8 us). The AP 110 configures the WUR Beacon interval $T_{WBI}$ according to the determined WUR TSF timer accuracy (e.g., +/−500 ppm) which is supposed to be derived from the worst WUR TSF timer implementation. As a result, the WUR Beacon interval $T_{WBI}$ can be configured so that the WUR receiver of any STA associated with the AP 110 is able to keep synchronized with the AP 110. Notice that the WUR TSF timer accuracy is typically much worse than the PCR TSF timer accuracy which is up to +/−100 ppm since the WUR has much lower power consumption than the PCR.

For example, assume that the maximum number of missed WUR Beacon frames is 10, AP TSF timer accuracy is +/−20 ppm, $L_{pt}$=12 and $D_{pt}$=8 us. So the maximum correctable drift is $d_{max}$=+/−16.384 ms according to Equation (1). Then $$T_{WBI} \leq \frac{16.384 \ast 10^{-3}s}{10 \ast (500+20) \ast 10^{-6}} \approx 3.15s \quad \text{[Math.2]}$$

Thus $T_{WBI}$ can be set to 2 s.

SECOND EMBODIMENT

According to a second embodiment of the present disclosure, the time resolution $D_{pt}$ of the Partial TSF field 506 is fixed (e.g., 8 us). Each STA associated with the AP 110 reports its WUR TSF timer accuracy to the AP 110, from which the worst WUR TSF timer accuracy is determined. The WUR TSF timer accuracy can be included in the WUR Capabilities element, as illustrated in FIG. 10. Then the AP 110 configures the WUR Beacon interval $T_{WBI}$ according to the determined worst WUR TSF timer accuracy. Note that the STAs associated with the AP 110 may have different WUR TSF timer accuracy, e.g., +/−100 ppm, +/−200 ppm or +/−500 ppm.

For example, assume that the worst WUR TSF timer accuracy among all STAs associated with the AP 110 is +/−200 ppm, the maximum number of missed WUR Beacon frames is 10, AP TSF timer accuracy is +/−20 ppm, $L_{pt}$=12 and $D_{pt}$=8 us. So the maximum correctable drift is $d_{max}$=+/−16.384 ms according to Equation (1). Then $$T_{WBI} \leq \frac{16.384 \ast 10^{-3}s}{10 \ast (20+200) \ast 10^{-6}} \approx 7.45s \quad \text{[Math.3]}$$

Thus $T_{WBI}$ can be set to 6 s. Notice that as $T_{WBI}$ becomes larger, WUR Beacon frames transmit less frequently.

With the same $L_{pt}$ and $D_{pt}$, the second embodiment of the present disclosure may result in lower channel overhead than the first embodiment since less WUR Beacon frames need to be transmitted to keep all STAs to be synchronized with the AP 110.

THIRD EMBODIMENT

According to a third embodiment of the present disclosure, the time resolution $D_{pt}$ of the Partial TSF field 506 is configurable. The AP 110 configures $D_{pt}$ and $T_{WBI}$ according to the determined WUR TSF timer accuracy (e.g., +/−500 ppm) which is supposed to be derived from the worst WUR TSF timer implementation. $D_{pt}$ and $T_{WBI}$ can be indicated in the WUR Mode element 724 as illustrated in FIG. 8.

For example, assume that the maximum number of missed WUR Beacon frames is 10, AP TSF timer accuracy is +/−20 ppm, $L_{pt}$=12 and $D_{pt}$=4 us or 8 us. When $D_{pt}$=8 us, the maximum correctable drift is $d_{max}$=+/−16.384 ms according to Equation (1). Then $$T_{WBI} \leq \frac{16.384 * 10^{-3} s}{10 * (20 + 500) * 10^{-6}} \approx 3.15 s \qquad [\text{Math.4}]$$

Thus $T_{WBI}$ can be set to 2 s when $D_{pt}$=8 us. On the other hand, when $D_{pt}$=4 us, the maximum correctable drift is $d_{max}$=+/−8.192 ms according to Equation (1). Then $$T_{WBI} \leq \frac{8.192 * 10^{-3} s}{10 * (20 + 500) * 10^{-6}} \approx 1.58 s \qquad [\text{Math.5}]$$

Thus $T_{WBI}$ can be set to is when $D_{pt}$=4 us. Notice that the smaller is $D_{pt}$ (which implies better synchronization accuracy), the smaller is $T_{WBI}$ (which implies larger channel overhead).

According to the third embodiment of the present disclsoure, it is possible for the AP 110 to configure $D_{pt}$ and $T_{WBI}$ so that a tradeoff between synchronization accuracy and channel overhead can be achieved.

FOURTH EMBODIMENT

According to a fourth embodiment of the present disclosure, the time resolution $D_{pt}$ of the Partial TSF field 506 is configurable. Each STA associated with the AP 110 reports its WUR TSF timer accuracy to the AP 110, from which the worst WUR TSF timer accuracy is determined. Note that STAs may have different WUR TSF timer accuracy, e.g., +/−100 ppm, +/−200 ppm or +/−500 ppm. The WUR TSF timer accuracy can be indicated in the WUR Capabilities element as illustrated in FIG. 10. Then the AP 110 configures $D_{pt}$ and $T_{WBI}$ according to the determined worst WUR TSF timer accuracy. $D_{pt}$ and $T_{WBI}$ can be indicated in the WUR Mode element 724 as illustrated in FIG. 8.

For example, assume that the worst WUR TSF timer accuracy among all STAs associated with the AP 110 is +/−200 ppm, the maximum number of missed WUR Beacon frames is 10, AP TSF timer accuracy is +/−20 ppm, $L_{pt}$=12 and $D_{pt}$=4 us or 8 us. When $D_{pt}$=8 us, the maximum correctable drift is $d_{max}$=+/−16.384 ms according to Equation (1). Then $$T_{WBI} \leq \frac{16.384 * 10^{-3} s}{10 * (20 + 200) * 10^{-6}} \approx 7.45 s \qquad [\text{Math.6}]$$

Thus $T_{WBI}$ can be set to 6 s when $D_{pt}$=8 us. On the other hand, when $D_{pt}$=4 us, the maximum correctable drift is $d_{max}$=+/−8.192 ms according to Equation (1). Then $$T_{WBI} \leq \frac{8.192 * 10^{-3} s}{10 * (20 + 200) * 10^{-6}} \approx 3.72 s \qquad [\text{Math.7}]$$

Thus $T_{WBI}$ can be set to 2 s when $D_{pt}$=4 us. Notice that the smaller is $D_{pt}$ (which implies better synchronization accuracy), the smaller is $T_{WBI}$ (which implies larger channel overhead).

According to the fourth embodiment of the present disclsoure, it is possible for the AP 110 to configure $D_{pt}$ and $T_{WBI}$ so that a tradeoff between synchronization accuracy and channel overhead can be achieved. In addition, with the same $D_{pt}$ and $L_{pt}$, the fourth embodiment may result in lower channel overhead than the third embodiment since less WUR Beacon frames need to be transmitted.

According to the present disclosure, if the WUR receiver of the STA being in WUR doze state does not receive any WUR Beacon frame within a time period which is equal to the WUR Beacon interval multiplied by the maximum number of missed WUR Beacon frames, it may determine its WUR losts synchronization with the AP 110. In this case, the STA may unsolicitedly transit to WUR awake state or exit from the WUR mode and then synchronize its WUR with the AP 110 by receiving Beacon frames from the AP 110.

An Example Format of a WUR Action Frame

FIG. 7 illustrates an example format of WUR Action frame 700 according to the present disclosure. The WUR Action frame 700 comprises a MAC Header portion 710 and a Frame Body portion 720. The Frame Body portion 720 comprises a WUR Action field 722 and a WUR Mode element 724. The WUR Action field 722 indicates the type of the WUR Action frame 700, e.g., WUR Mode Request frame or WUR Mode Response frame.

An Example Format of a WUR Mode Element

FIG. 8 illustrates an example format of WUR Mode element 724 according to the present disclosure. The WUR Mode element 724 comprises an Action Type field 802, a WUR Mode Response Status field 804, a Wake-up Operating Parameters field 808 and a Parameter Change Interval field 810. The Action Type field 802 indicates which one of the WUR negotiation procedure, the WUR mode entry procedure, the integrated WUR negotiation and WUR mode entry procedure and the WUR mode exit procedure the WUR Action frame 700 containing the WUR Mode element 724 involves, as illustrated in FIG. 9. The WUR Mode Response Status field 804 indicates whether the request for entering or exiting WUR mode is accepted or rejected. The Wake-up Operating Parameters field 808 contains configurable wake-up operating parameters, e.g., time resolution of the Partial TSF field 506, WUR Beacon interval, duty cycle schedule of the STA's WUR receiver and WID. The Parameter Change Interval field 810 indicates when new configurable wake-up operating parameters take effect.

An Example Format of a WUR Capabilities Element

FIG. 10 illustrates an example format of WUR Capabilities element 1000 according to the present disclosure. The WUR Capabilities element 1000 comprises a STA Capabilities field 1006 and an AP Capabilities field 1008. The STA Capabilities field 1006 contains nonconfigurable wake-up operating parameters specific to a STA, e.g., WUR TSF timer accuracy and time required for turning on the STA's PCR. The AP Capabilities field 1008 contains nonconfigurable wake-up operating parameters specific to the AP 110, e.g., WUR time unit and minimum WUR on duration.

An Example Format of a Wake-Up Frame

FIG. 11 illustrates an example format of wake-up frame 1100 according to the present disclosure. The wake-up frame 1100 comprises a Frame Control field 1102, an Address field 1104 and a Parameter Negotiation Request field 1106. The Frame Control field 1102 comprises a Type subfield which identifies the WUR frame type (e.g., WUR Beacon frame, unicast wake-up frame or multicast wake-up frame). The Address field 1104 contains a WID which identifies both the AP 110 and the intended STA. The Parameter Negotiation Request field 1106 indicates whether the AP 110 intends to negotiate new configurable wake-up operating parameters.

An Example Format of a WUR PPDU

FIG. 12 illustrates an example format of WUR PPDU 1200 according to the present disclosure. The WUR PPDU 1200 comprises a legacy preamble 1202, a mark symbol 1204, a WUR preamble 1206 and a WUR payload portion 1208. The legacy preamble 1202 and the mark symbol 1204 are transmitted with 20 MHz bandwidth while the WUR preamble 1206 and the WUR payload portion 1208 are transmitted with 4 MHz bandwidth. The legacy preamble 1202 and the mark symbol 1204 assist third party STAs in avoiding unnecessary channel access collision. The WUR preamble 1206 aims to be used by a WUR receiver to perform time synchronization and packet detection. The WUR preamble 1206 may also indicate the data rate of the WUR payload portion 1208. The WUR payload portion 1208 contains a WUR frame (e.g., WUR Beacon frame, unicast wake-up frame or multicast wake-up frame).

Configuration of a WUR Apparatus

Figure 13A:
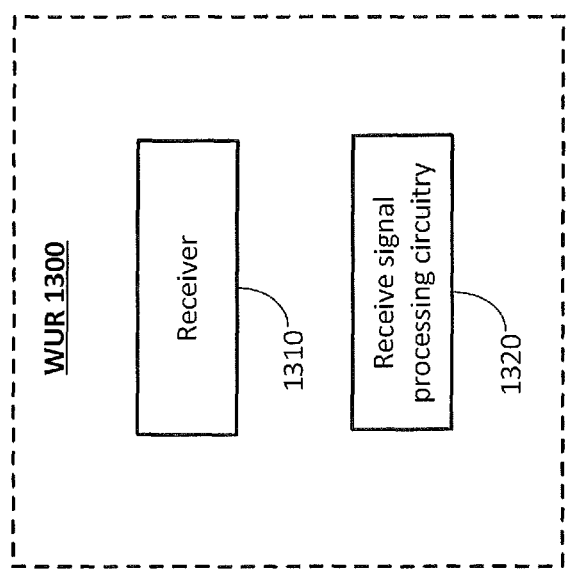
FIG. 13A is a simple block diagram of an example WUR according to the present disclosure.

FIG. 13A is a simple block diagram of an example WUR 1300 which is capable of receiving wake-up signal. The WUR 1300 may be the WUR 134 in the STA 130 or the WUR 144 in the STA 140 as illustrated in FIG. 1. The WUR 1300 comprises a receiver 1310 and receive signal processing circuitry 1320. The receiver 1310 is responsible for reception of wake-up signal, and the receive signal processing circuitry 1320 is responsible for processing the received wake-up signal.

Figure 13B:
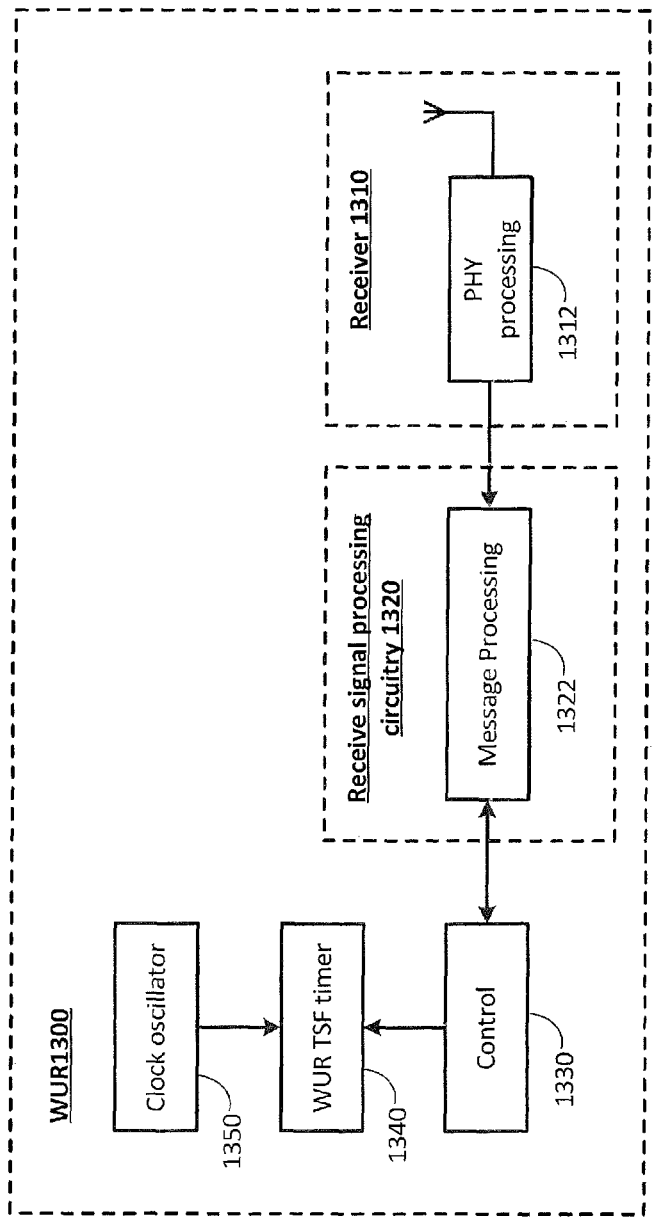
FIG. 13B is a detailed block diagram of an example WUR according to the present disclosure.

FIG. 13B is a detailed block diagram of the example WUR 1300. The WUR 1300 further comprises control circuitry 1330 and a WUR TSF timer 1340 which is drived by a clock oscillator 1350. The control circuitry 1330 is used to control general MAC protocol operations. In particular, the control circuitry 1330 is used to set the WUR TSF timer 1340 according to received partial TSF. The receiver 1310 of the WUR 1300 comprises PHY processing circuitry 1312, which is responsible for converting PPDUs received through antennas into MAC frames (e.g., wake-up frames or WUR Beacon frames). The receive signal processing circuitry 1320 of the WUR 1300 comprises message processing circuitry 1322, which is responsible for processing the received MAC frames under the control of the control circuitry 1330 according to the various embodiments of the present disclosure and passing the corresponding MAC information to the control circuitry 1330. In particular, the message processing circuitry 1322 is used to extract the partial TSF from each of the received WUR Beacon frames.

The WUR 1300 may comprise many other components that are not illustrated, for sake of clarity, in FIG. 13A and FIG. 13B. Only those components that are most pertinent to the present disclosure are illustrated.

Configuration of a PCR Apparatus

Figure 14A:
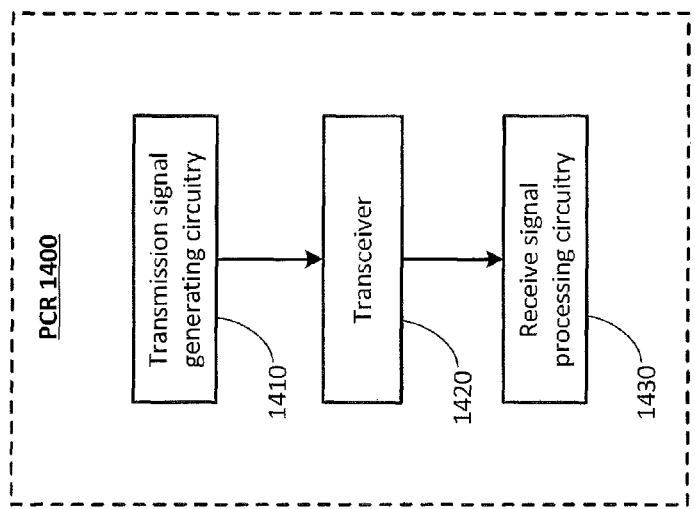
FIG. 14A is a simple block diagram of an example PCR according to the present disclosure.

FIG. 14A is a simple block diagram of an example PCR 1400 which is capable for transmitting and receiving standard IEEE 802.11 signal. The PCR 1400 may be the PCR 112 in the AP 110, the PCR 132 in the STA 130 or the PCR 142 in the STA 140 as illustrated in FIG. 1. In particular, the PCR 112 in the AP 110 is also capable for transmitting wake-up signal. The PCR 1400 comprises a transmission signal generating circuitry 1410, a transceiver 1420 and a receive signal processing circuitry 1430. The transmission signal generating circuitry 1410 is responsible for generating standard IEEE 802.11 signal and wake-up signal if applicable, the transceiver 1420 is responsible for transmitting the generated standard IEEE 802.11 signal and wake-up signal if applicable as well as receiving the standard IEEE 802.11 signal, and the receive signal processing circuitry 1430 is responsible for processing the received standard IEEE 802.11 signal.

Figure 14B:
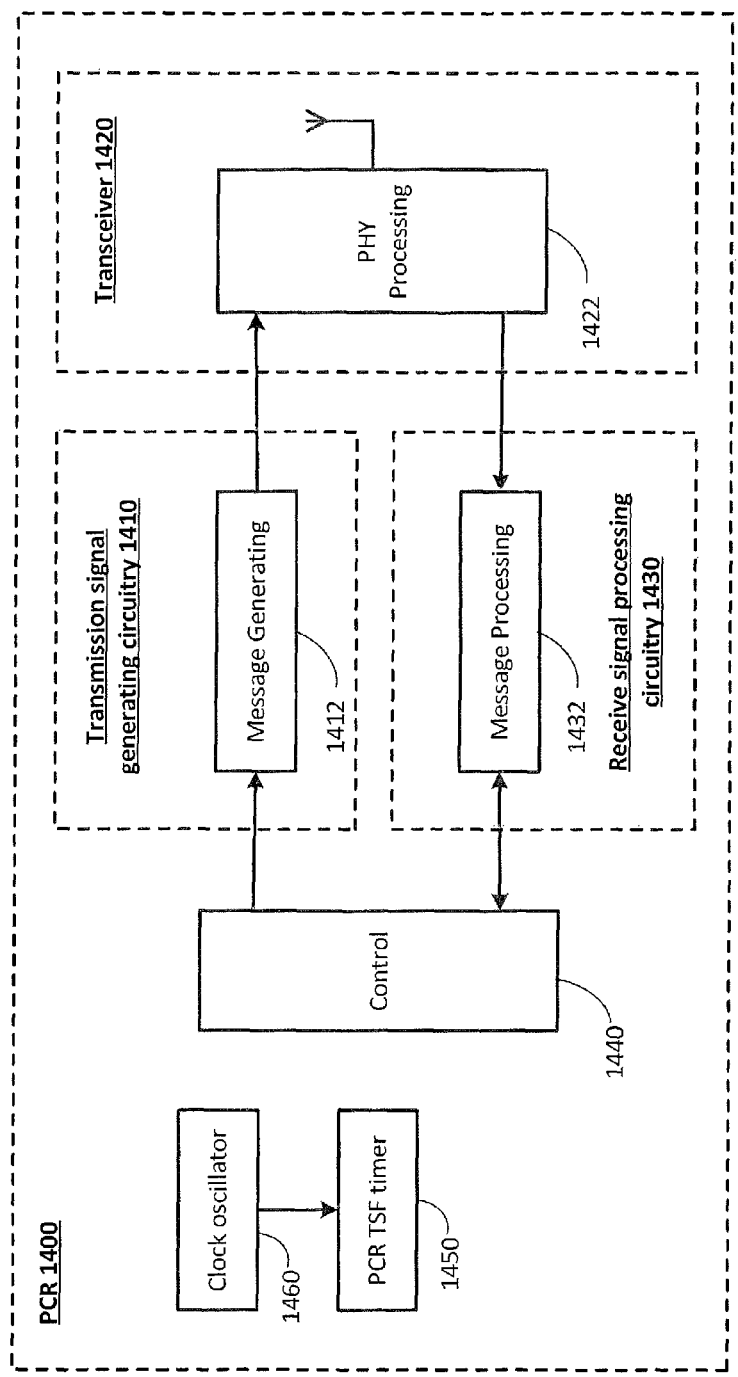
FIG. 14B is a detailed block diagram of an example PCR according to the present disclosure.

FIG. 14B is a detailed block diagram of the example PCR 1400. The PCR 1400 further comprises a control circuitry 1440 and a PCR TSF timer 1450 which is drived by a clock oscillator 1460. The control circuitry 1440 is used to control general MAC protocol operation. The transmission signal generating circuitry 1410 comprises a message generating circuitry 1412, which is responsible for generating MAC frames (e.g., Beacon frame, Probe Request/Response frame, Association Reqeust/Response frame, Reassociation Request/Response frame, Data frame, acknowledgement frame, WUR Action frame, wake-up frame and WUR Beacon frame) under the control of the control circuitry 1440 according to various embodiments of the present disclosure. The transceiver 1420 comprises a PHY processing circuitry 1422, which is responsible for formulating the generated MAC frames into PPDUs and transmitting them through antennas as well as converting PPDUs received through the antennas into MAC frames. The receive signal processing circuitry 1430 comprises a message processing circuitry 1432, which is responsible for processing the received MAC frames (e.g., parsing MAC Header, etc.) under the control of the control circuitry 1440 and passing the corresponding MAC information to the control circuitry 1440.

According to the present disclosure, when the PCR 1400 is used in the WUR STA 130 or the WUR STA 140, the PCR TSF timer 1450 and the WUR TSF timer 1340 are synchronized each other when the WUR STA is operating in WUR mode. Preferably the WUR STA operating in WUR mode synchronizes the PCR TSF timer 1450 and WUR TSF timer 1340 when it transits to WUR doze state from WUR awake state and vice versa. Alternatively, the WUR STA operating in WUR mode may use a common TSF timer as the PCR TSF timer 1450 and the WUR TSF Timer 1340.

The PCR 1400 may comprise many other components that are not illustrated, for sake of clarity, in FIG. 14A and FIG. 14B. Only those components that are most pertinent to the present disclosure are illustrated.

WUR Mode Operation Related State Machine

Figure 15:
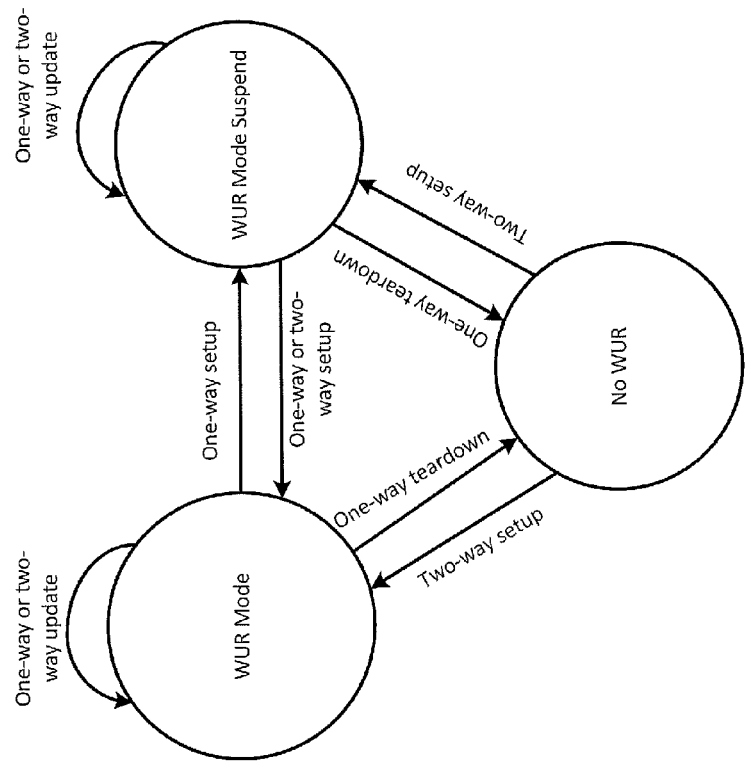
FIG. 15 is a diagram illustrating simplified WUR mode operation related state transition for a wireless communication device according to the present disclosure.

FIG. 15 illustrates simplified WUR mode operation related state machine for the STA according to the present disclosure. The STA has three states related to WUR mode operation. The first state is called "no WUR" in which wake-up operating parameters are not in place. In the first state, negotiating wake-up operating parameters between the AP 110 and the STA has not been completed or the negitiated wake-up operating parameters are discarded after the STA exits from the WUR mode. The first state as illustrated in FIG. 15 corresponds to the first and second states as illustrated in FIG. 4. The second state is called "WUR Mode Suspend" in which wake-up operating parameters are in place but WUR mode is not operated. In the second state, negotiating wake-up operating parameters between the AP 110 and the STA has been completed or the negitiated wake-up operating parameters are maintained after the STA exits from the WUR mode. The second state as illustrated in FIG. 15 corresponds to the third state as illustrated in FIG. 4. The third state is called "WUR Mode" in which the STA operates in the WUR mode according to the negotiated wake-up operating parameters. The third state as illustrated in FIG. 15 corresponds to the fourth and fifth state as illustrated in FIG. 4.

Figure 16A:
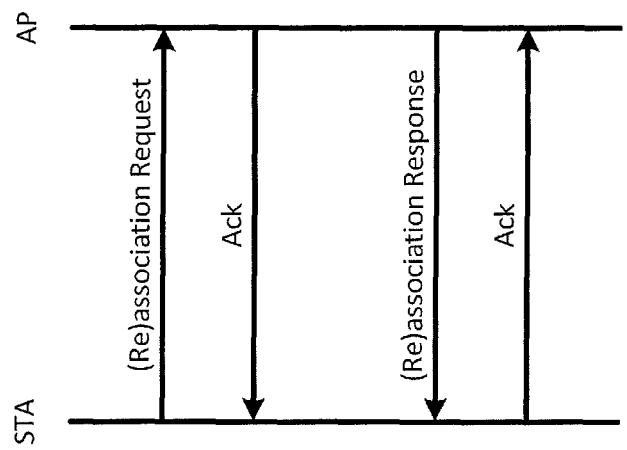
FIG. 16A is a diagram illustrating a first example two-way setup procedure according to the present disclosure.
Figure 16B:
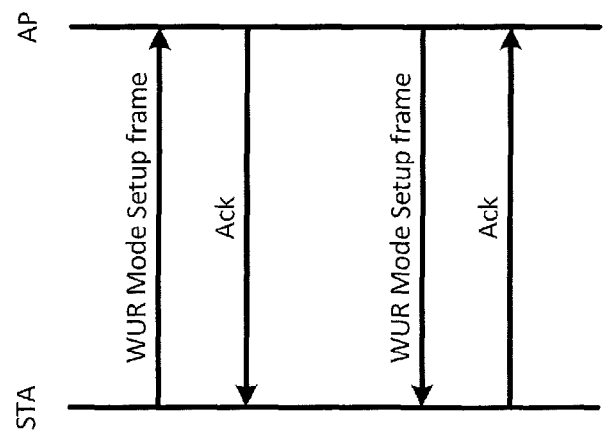
FIG. 16B is a diagram illustrating a second example two-way setup procedure according to the present disclosure.

As illustrated in FIG. 15, the STA staying in "no WUR" can transit to operate in "WUR Mode Suspend" after a two-way setup procedure initiated by the STA is completed. FIG. 16A illustrates a first example two-way setup procedure according to the present disclsoure. The first example two-way setup procedure has the same functionality as the association procedure incorporating WUR negotiation as illustrated in FIG. 3. The STA transmits an Association Request frame or a Reassociation Request frame to the AP 110. The Association Request frame or the Reassociation Request frame contains a WUR Mode element (as illustrated in FIG. 8) in which the Action Type field is set to "Enter WUR Mode Suspend Request" (as illustrated in FIG. 22) and the Wake-up Operating Parameters field contains the preferred duty cycle schedule of the STA's WUR receiver. The AP 110 responds with an Ack frame upon the successful receipt of the Association Request frame or the Reassociation Request frame. After that, the AP 110 transmits an Association Response frame or a Reassociation Response frame to the STA. The Association Response frame or the Reassociation Response frame contains a WUR Mode element (as illustrated in FIG. 8) in which the Action Type field is set to "Enter WUR Mode Suspend Response" (as illustrated in FIG. 22) and the WUR Mode Response Status field is set to "Enter WUR Mode Suspend Accept" or "Denied" (as illustrated in FIG. 23). If the WUR Mode Response Status field is set to "Enter WUR Mode Suspend Accept", the Wake-up Operating Parameters field contains the time resolution of partial TSF, the duty cycle schedule of the STA's WUR receiver, WUR Beacon interval, WID and WUR operating channel, etc. If the WUR Mode Response Status field is set to "Denied", the Wake-up Operating Parameters field is not present. FIG. 16B illustrates a second example two-way setup procedure according to the present disclosure. The second example two-way setup procedure has the same functionality as the WUR negotiation procedure as illustrated in FIG. 2. The STA transmits a WUR Mode Setup frame to the AP 110. The WUR Mode Setup frame is a WUR Action frame (as illustrated in FIG. 7) with the WUR Action field set to "WUR Mode Setup" (as illustrated in FIG. 21). The WUR Mode Setup frame contains a WUR Mode element (as illustrated in FIG. 8) in which the Action Type field is set to "Enter WUR Mode Suspend Request" (as illustrated in FIG. 22) and the Wake-up Operating Parameters field contains the preferred duty cycle schedule of the STA' s WUR receiver. The AP 110 responds with an Ack frame upon the succesful receipt of the WUR Mode Setup frame. After that, the AP 110 transmits a WUR Mode Setup frame to the STA. The WUR Mode Setup frame contains a WUR Mode element (as illustrated in FIG. 8) in which the Action Type field is set to "Enter WUR Mode Suspend Response" (as illustrated in FIG. 22) and the WUR Mode Response Status field is set to "Enter WUR Mode Suspend Accept" or "Denied" (as illustrated in FIG. 23). If the WUR Mode Response Status field is set to "Enter WUR Mode Suspend Accept", the Wake-up Operating Parameters field contains the time resolution of partial TSF, the duty cycle schedule of the STA's WUR receiver, WUR Beacon interval, WID and WUR operating channel, etc. If the WUR Mode Response Status field is set to "Denied", the Wake-up Operating Parameters field is not present.

Figure 17A:
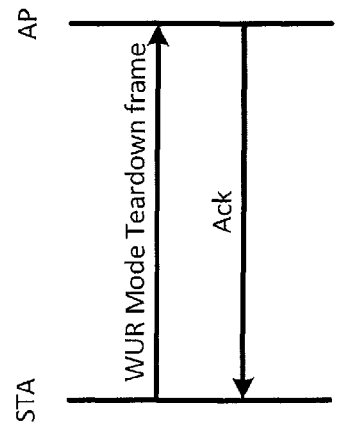
FIG. 17A is a diagram illustrating a first example one-way teardown procedure according to the present disclosure.
Figure 17B:
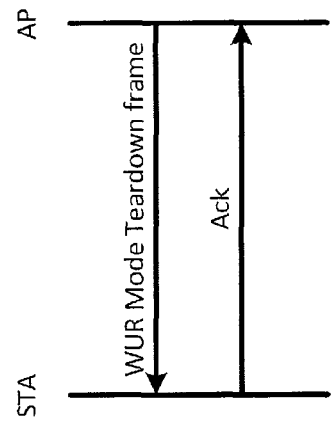
FIG. 17B is a diagram illustrating a second example one-way teardown procedure according to the present disclosure.

As illustrated in FIG. 15, the STA staying in the "WUR Mode Suspend" can transit to operate in the "No WUR" after a one-way teardown procedure initiated by the AP 110 or the STA is completed. FIG. 17A illustrates a first example one-way teardown procedure initiated by the STA. The STA transmits a WUR Mode Teardown frame to the AP 110. The WUR Mode Teardown frame is a WUR Action frame (as illustrated in FIG. 7) with the WUR Action field set to "WUR Mode Teardown" (as illustrated in FIG. 21). The WUR Mode Teardown frame does not include a WUR Mode element. The AP 110 responds with an Ack frame upon the succesful receipt of the WUR Mode Teardown frame. After receiving the Ack frame, the STA discards the negotiated wake-up operating parameters. FIG. 17B illustrates a second example one-way teardown procedure initiated by the AP 110. The AP 110 transmits a WUR Mode Teardown frame to the STA. The WUR Mode Teardown frame does not include a WUR Mode element. The STA responds with an Ack frame upon the successful receipt of the WUR Mode Teardown frame. After transmitting the Ack frame, the STA discards the negotiated wake-up operating parameters.

As illustrated in FIG. 15, the STA staying in the "No WUR" can transit to operate in the "WUR Mode" after a two-way setup procedure initiated by the STA is completed. FIG. 16A illustrates a first example two-way setup procedure. The first example two-way setup procedure has the same functionality as the association procedure incorporating WUR negotiation and WUR mode entry. The STA transmits an Association Request frame or a Reassociation Request frame to the AP 110. The Association Request frame or the Reassociation Request frame contains a WUR Mode element (as illustrated in FIG. 8) in which the Action Type field is set to "Enter WUR Mode Request" (as illustrated in FIG. 22) and the Wake-up Operating Parameters field contains the preferred duty cycle schedule of the STA's WUR receiver. The AP 110 responds with an Ack frame upon the succesful receipt of the Association Request frame or the Reassociation Request frame. After that, the AP 110 transmits an Association Response frame or a Reassociation Response frame to the STA. The Association Response frame or the Reassociation Response frame contains a WUR Mode element (as illustrated in FIG. 8) in which the Action Type field is set to "Enter WUR Mode Response" (as illustrated in FIG. 22) and the WUR Mode Response Status field is set to "Enter WUR Mode Accept" or "Denied" (as illustrated in FIG. 23). If the WUR Mode Response Status field is "Enter WUR Mode Accept", then the Wake-up Operating Parameters field contains the time resolution of partial TSF, the duty cycle schedule of the STA's WUR receiver, WUR Beacon interval, WID and WUR operating channel, etc. If the WUR Mode Response Status field is "Denied", the Wake-up Operating Parameters field is not present. FIG. 16B illustrates a second example two-way setup procedure. The second example two-way setup procedure has the same functionality as the integrated WUR negotiation and WUR mode entry procedure. The STA transmits a WUR Mode Setup frame to the AP 110. The WUR Mode Setup frame contains a WUR Mode element (as illustrated in FIG. 8) in which the Action Type field is set to "Enter WUR Mode Request" (as illustrated in FIG. 22) and the Wake-up Operating Parameters field contains the preferred duty cycle schedule of the STA's WUR receiver. The AP 110 responds with an Ack frame upon the succesful receipt of the WUR Mode Setup frame. After that, the AP 110 transmits a WUR Mode Setup frame to the STA. The WUR Mode Setup frame contains a WUR Mode element (as illustrated in FIG. 8) in which the Action Type field is set to "Enter WUR Mode Response" (as illustrated in FIG. 22) and the WUR Mode Response Status field is set to "Enter WUR Mode Accept" or "Denied" (as illustrated in FIG. 23). If the WUR Mode Response Status field is "Enter WUR Mode Accept", then the Wake-up Operating Parameters field contains the time resolution of partial TSF, the duty cycle schedule of the STA's WUR receiver, WUR Beacon interval, WID and WUR operating channel, etc. If the WUR Mode Response Status field is "Denied", the Wake-up Operating Parameters field is not present.

As illustrated in FIG. 15, the STA staying in the "WUR Mode" can transit to operate in the "No WUR" after a one-way teardown procedure initiated by the STA or the AP 110 is completed. FIG. 17A illustrates a first example one-way teardown procedure initiated by the STA. The STA transmits a WUR Mode Teardown frame to the AP 110. The WUR Mode Teardown frame is a WUR Action frame (as illustrated in FIG. 7) with the WUR Action field set to "WUR Mode Teardown" (as illustrated in FIG. 21). The WUR Mode Teardown frame does not include a WUR Mode element. The AP 110 responds with an Ack frame upon the succesful receipt of the WUR Mode Teardown frame. After receiving the Ack frame, the STA exits from the WUR mode and discards the negotiated wake-up operating parameters. FIG. 17B illustrates a second example one-way teardown procedure initiated by the AP 110. The AP 110 transmits a WUR Mode Teardown frame to the STA. The WUR Mode Teardown frame does not include a WUR Mode element. The STA responds with an Ack frame upon the succesful receipt of the WUR Mode Teardown frame. After transmitting the Ack frame, the STA exits from the WUR mode and discards the negotiated wake-up operating parameters.

Figure 18A:
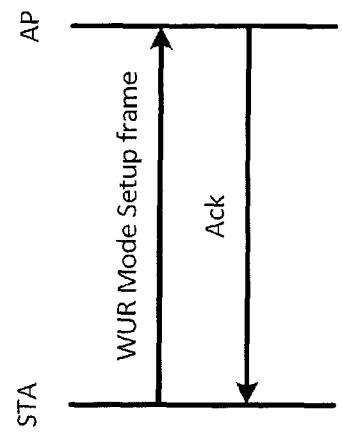
FIG. 18A is a diagram illustrating a first example one-way setup procedure according to the present disclosure.

As illustrated in FIG. 15, the STA staying in the "WUR Mode Suspend" can transit to the "WUR Mode" after a one-way or two-way setup procedure initiated by the STA is completed. FIG. 18A illustrates an example one-way setup procedure initiated by the STA. The example one-way setup procedure has the same functionality as the WUR mode entry procedure as illustrated in FIG. 2 or FIG. 3. The STA transmits a WUR Mode Setup frame to the AP 110. The WUR Mode Setup frame contains a WUR Mode element (as illustrated in FIG. 8) in which the Action Type field is set to "Enter WUR Mode" (as illustrated in FIG. 22) and the Wake-up Operating Parameters field is not present. The AP 110 responds with an Ack frame upon the succesful receipt of the WUR Mode Setup frame. After receiving the Ack frame, the STA operates in the WUR mode according to the existing wake-up operating parameters. FIG. 16B illustrates an example two-way setup procedure initiated by the STA. The example two-way setup procedure has the same functionality as the integrated WUR mode entry and WUR negotiation procedure. The STA transmits a WUR Mode Setup frame to the AP 110. The WUR Mode Setup frame contains a WUR Mode element (as illustrated in FIG. 8) in which the Action Type field is set to "Enter WUR Mode Request" (as illustrated in FIG. 22) and the Wake-up Operating Parameters field contains the preferred duty cycle schedule of the STA's WUR receiver. The AP 110 responds with an Ack frame upon the succesful receipt of the WUR Mode Setup frame. After that, the AP 110 transmits a WUR Mode Setup frame to the STA. The WUR Mode Setup frame contains a WUR Mode element (as illustrated in FIG. 8) in which the Action Type field is set to "Enter WUR Mode Response" (as illustrated in FIG. 22) and the WUR Mode Response Status field is set to "Enter WUR Mode Accept" or "Denied" (as illustrated in FIG. 23). If the WUR Mode Response Status field is "Enter WUR Mode Accept", then the Wake-up Operating Parameters field contains the time resolution of partial TSF, the duty cycle schedule of the STA's WUR receiver, WUR Beacon interval, WID and WUR operating channel, etc. If the WUR Mode Response Status field is "Denied", the Wake-up Operating Parameters field is not present.

Figure 18B:
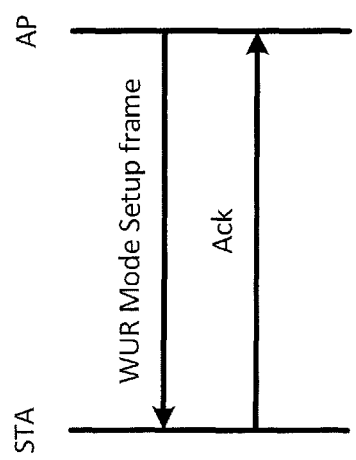
FIG. 18B is a diagram illustrating a second example one-way setup procedure according to the present disclosure.

As illustrated in FIG. 15, the STA staying in the "WUR Mode" can transit to the "WUR Mode Suspend" after a one-way setup procedure initiated by the STA or the AP 110 is completed. FIG. 18A illustrates a first example one-way setup procedure initiated by the STA. The first example one-way setup procedure has the same functionality as the WUR mode exit procedure as illustrated in FIG. 2 or FIG. 3. The STA transmits a WUR Mode Setup frame to the AP 110. The WUR Mode Setup frame contains a WUR Mode element (as illustrated in FIG. 8) in which the Action Type field is set to "Enter WUR Mode Suspend" (as illustrated in FIG. 22) and the Wake-up Operating Parameters field is not present. The AP 110 responds with an Ack frame upon the succesful receipt of the WUR Mode Setup frame. After receiving the Ack frame, the STA exits from the WUR mode and maintains the negotiated wake-up operating parameters. FIG. 18B illustrates a second example one-way setup procedure initiated by the AP 110. The AP 110 transmits a WUR Mode Setup frame to the STA. The WUR Mode Setup frame contains a WUR Mode element (as illustrated in FIG. 8) in which the Action Type field is set to "Enter WUR Mode Suspend" (as illustrated in FIG. 22) and the Wake-up Operating Parameters field is not present. The STA responds with an Ack frame upon the succesful receipt of the WUR Mode Setup frame. After transmitting the Ack frame, the STA exits from the WUR mode and maintains the negotiated wake-up operating parameters.

Figure 19:
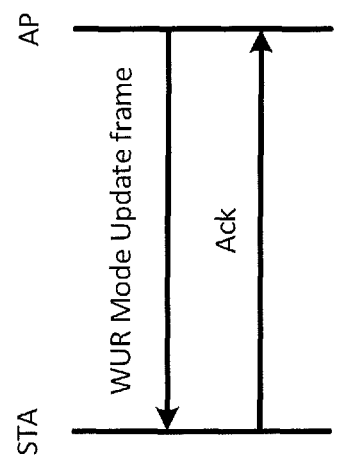
FIG. 19 is a diagram illustrating an example one-way update procedure according to the present disclosure.
Figure 20:
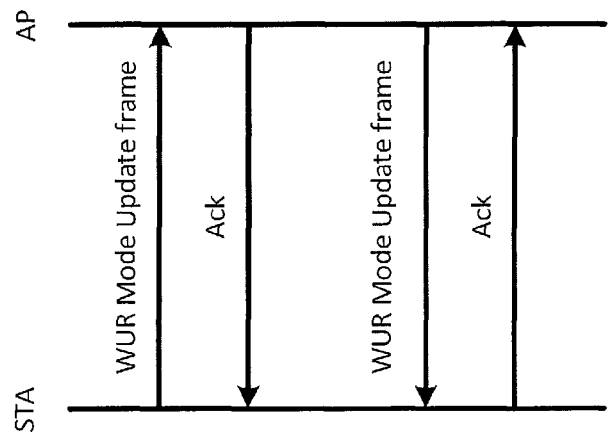
FIG. 20 is a diagram illustrating an example two-way update procedure according to the present disclosure.

As illustrated in FIG. 15, for the STA staying in the "WUR Mode Suspend" or "WUR Mode", the wake-up operating parameters can be updated via a one-way procedure initiated by the AP 110 or a two-way update procedure initiated by the STA. FIG. 19 illustrates an example one-way update procedure initiated by the AP 110. The AP 110 transmits a WUR Mode Update frame to the STA. The WUR Mode Update frame is a WUR Action frame (as illustrated in FIG. 7) with the WUR Action field set to "WUR Mode Update" (as illustrated in FIG. 21). The WUR Mode Update frame contains a WUR Mode element (as illustrated in FIG. 8) in which the Action Type field is set to "Update WUR Parameters" (as illustrated in FIG. 22), the Wake-up Operating Parameters field contains the time resolution of partial TSF, the duty cycle schedule of the STA's WUR receiver, WUR Beacon interval, WID and WUR operating channel, etc., and the Parameter Change Interval field indicates when new wake-up operating parameters take effect. The STA responds with an Ack frame upon the succesful receipt of the WUR Mode Update frame and updates the wake-up operating parameters accordingly. FIG. 20 illustrates an example two-way update procedure initiated by the STA. The example two-way update procedure has the same functionality as the WUR negotiation procedure. The STA transmits a WUR Mode Update frame to the AP 110. The WUR Mode Update frame contains a WUR Mode element (as illustrated in FIG. 8) in which the Action Type field is set to "Update WUR Parameters Request" (as illustrated in FIG. 22) and the Wake-up Operating Parameters field contains the preferred duty cycle schedule of the STA's WUR receiver. The AP 110 responds with an Ack frame upon the succesful receipt of the WUR Mode Update frame. After that, the AP 110 transmits a WUR Mode Update frame to the STA. The WUR Mode Update frame contains a WUR Mode element (as illustrated in FIG. 8) in which the Action Type field is set to "Update WUR Parameters Response" (as illustrated in FIG. 22), the Wake-up Operating Parameters field contains the time resolution of partial TSF, the duty cycle schedule of the STA's WUR receiver, WUR Beacon interval, WID and WUR operating channel, etc., and the Parameter Change Interval field indicates when new wake-up operating parameters take effect. The STA responds with an Ack frame upon the succesful receipt of the WUR Mode Update frame and updates the wake-up operating parameters accordingly.

According to the present disclosure, if the AP 110 intends to change wake-up operating parameters for the STA in the "WUR Mode Suspend" or the "WUR Mode", the one-way update procedure as illustrated in FIG. 19 is preferable since it results in less channel overhead than the two-way update procedure as illustrated in FIG. 20.

According to the present disclosure, if the STA in the "WUR Mode Suspend" intends to transits to operate in the "WUR Mode" with new wake-up operating parameters, the two-way setup procedure as illustrated in FIG. 16B is preferable since it results in less channel overhead than the two-way update procedure as illustrated in FIG. 20 followed by the one-way setup procedure as illustrated in FIG. 18A.

An Example Format of the WUR Action Field

FIG. 21 illustrates another example format of the WUR Action field 722 of the WUR Action frame 700 according to the present disclosure. The WUR Action field 722 indicates the type of the WUR Action frame 700, e.g., WUR Mode Setup frame, WUR Mode Teardown frame or WUR Mode Update frame.

An Example Format of the Action Type Field

FIG. 22 illustrates another example format of the Action Type field 802 of the WUR Mode element 724 according to the present disclosure. The Action Type field 802 indicates the WUR mode operation related action for the Association Request frame, the Association Response frame, the Reassociation Request frame, the Reassociation Response frame, the WUR Mode Setup frame or the WUR Mode Update frame containing the WUR Mode element 724.

An Example Format of the WUR Mode Response Status Field

FIG. 23 illustrates another example format of the WUR Mode Response Status 804 of the WUR Mode element 724 according to the present disclosure. The WUR Mode Response Status 804 indicates the STA's request for operating in the "WUR Mode" or "WUR Mode Suspend" is accepted or rejected.

Configuration of a WUR Apparatus

Figure 24:
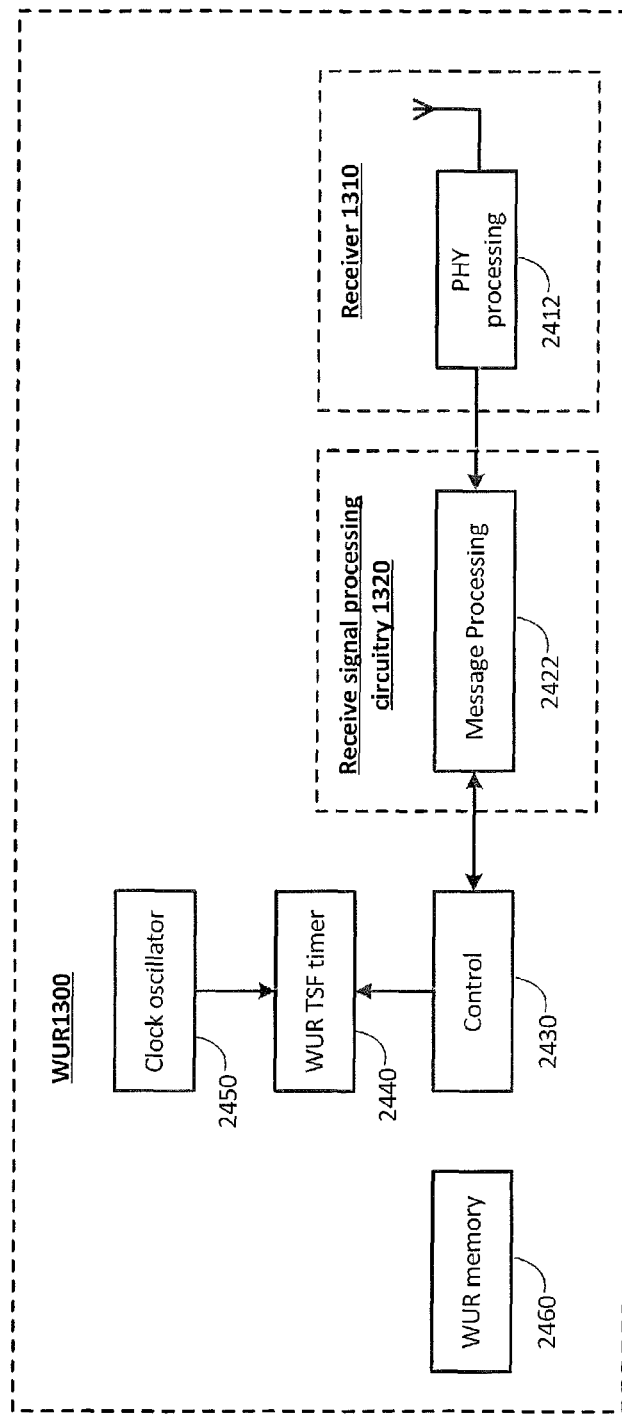
FIG. 24 is a detailed block diagram of another example WUR according to the present disclosure.

FIG. 24 is a detailed block diagram of another example WUR 1300. The WUR 1300 further comprises control circuitry 2430, a WUR memory 2460, and a WUR TSF timer 2440 which is drived by a clock oscillator 2450. The control circuitry 2430 is used to control general MAC protocol operations. In particular, the control circuitry 2430 is used to set the WUR TSF timer 2440 according to received partial TSF. The receiver 1310 of the WUR 1300 comprises PHY processing circuitry 2412, which is responsible for converting PPDUs received through antennas into MAC frames (e.g., wake-up frames or WUR Beacon frames). The receive signal processing circuitry 1320 of the WUR 1300 comprises message processing circuitry 2422, which is responsible for processing the received MAC frames under the control of the control circuitry 2430 according to the various embodiments of the present disclosure and passing the corresponding MAC information to the control circuitry 2430. In particular, the message processing circuitry 2422 is used to extract the partial TSF from each of the received WUR Beacon frames. The WUR memory 2460 is responsible for storing the negotiated wake-up operating parameters between the WUR STA (e.g., 130 or 140) containing the WUR 1300 and the AP 110, especially when the WUR STA operates in the "WUR Mode Suspend".

Configuration of a PCR Apparatus

Figure 25:
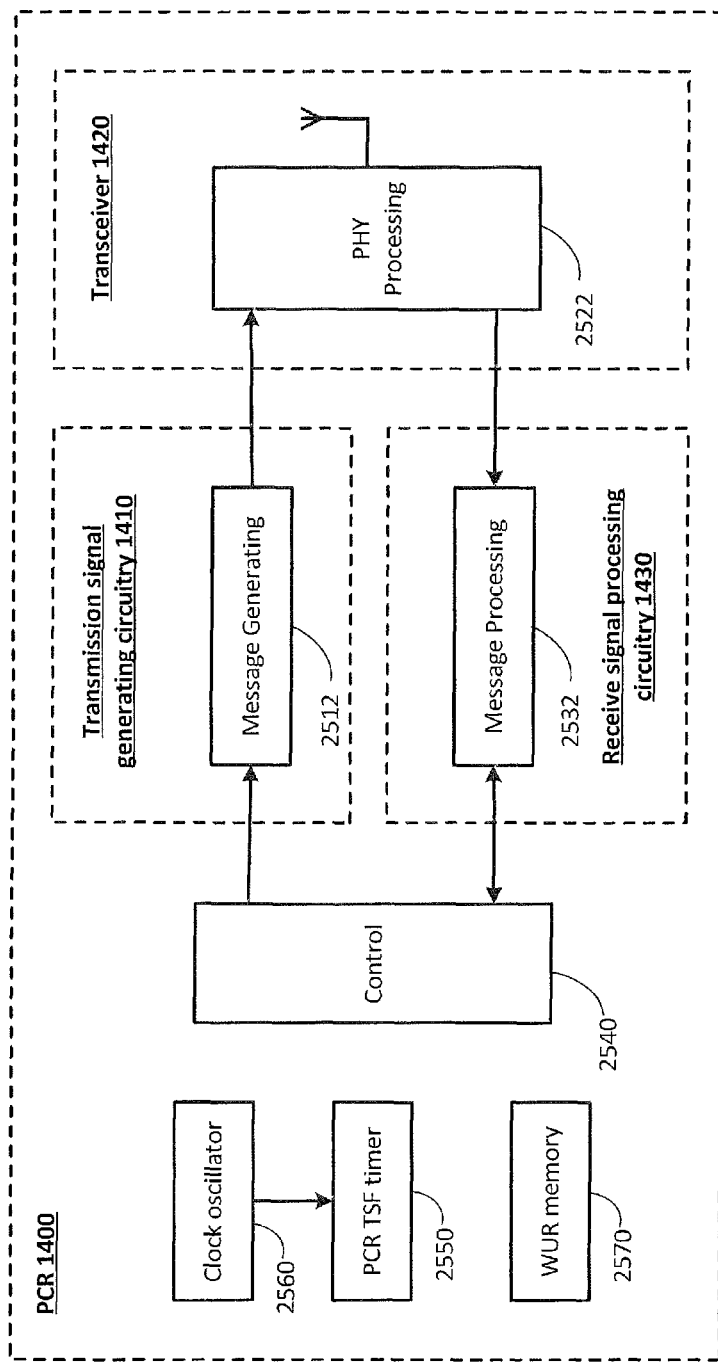
FIG. 25 is a detailed block diagram of another example PCR according to the present disclosure.

FIG. 25 is a detailed block diagram of another example PCR 1400. The PCR 1400 further comprises control circuitry 2540 and a PCR TSF timer 2550 which is drived by a clock oscillator 2560. The control circuitry 2540 is used to control general MAC protocol operation. The transmission signal generating circuitry 1410 comprises message generating circuitry 2512, which is responsible for generating MAC frames (e.g., Beacon frame, Probe Request/Response frame, Association Reqeust/Response frame, Reassociation Request/Response frame, Data frame, acknowledgement frame, WUR Action frame, wake-up frame and WUR Beacon frame) under the control of the control circuitry 2540 according to various embodiments of the present disclosure. The transceiver 1420 comprises PHY processing circuitry 2522, which is responsible for formulating the generated MAC frames into PPDUs and transmitting them through antennas as well as converting PPDUs received through the antennas into MAC frames. The receive signal processing circuitry 1430 comprises message processing circuitry 2532, which is responsible for processing the received MAC frames (e.g., parsing MAC Header, etc.) under the control of the control circuitry 2540 and passing the corresponding MAC information to the control circuitry 2540.

According to the present disclosure, when the PCR 1400 is used in the AP 110, it further comprises a WUR memory 2570, which is responsible for storing the negotiated wake-up operating parameters between the WUR STAs (e.g., 130 and 140) and the AP 110, especially when the WUR STAs operate in the "WUR Mode Suspend".

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Should a circuit integration technology replacing LSI appear as a result of advancements in semiconductor technology or other technologies derived from the technology, the functional blocks could be integrated using the future integrated circuit technology. Another possibility is the application of biotechnology and/or the like.

The present disclosure can be realized by any kind of apparatus, device or system having a function of communication, which is referred as a communication apparatus.

Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The disclosure of Japanese Patent Application No. 2017-211978, filed on Nov. 1, 2017 and Japanese Patent Application No. 2017-245250, filed on Dec. 21, 2017, including the specification, drawings and abstract, is incorporated herein by reference in its entirety.

INDUSTRIAL APPLICABILITY

This disclosure can be applied to an apparatus and a method for WUR mode operation in a wireless network.

REFERENCE SIGNS LIST

110 AP
130, 140 STA
112, 132, 142, 1400 PCR
134, 144, 1300 WUR
1310 Receiver
1312, 1422, 2412, 2522 PHY processing circuitry
1320, 1430 Receive signal processing circuitry
1322, 1432, 2422, 2532 Message processing circuitry
1330, 1440, 2430, 2540 Control circuitry
1340, 2440 WUR TSF timer
1350, 1460, 2450, 2560 Clock oscillator
1410 Transmission signal generating circuitry
1412, 2512 Message generating circuitry
1420 Transceiver
1450, 2550 PCR TSF timer
2460, 2570 WUR memory

The invention claimed is:

1. A communication apparatus, comprising:
a receiver which, in operation and in a Wake-up Radio (WUR) state, receives a WUR Beacon transmission in a WUR beacon interval, the receiver being configured not to receive buffered downlink traffic data during the WUR state, wherein, during the WUR state, the communication apparatus continues to operate through the WUR beacon interval for two WUR duty cycles, the WUR beacon interval being configured for receiving one WUR Beacon transmission, and each WUR duty cycle including a WUR awake state and a WUR doze state; and
circuitry which, in operation:
determines wake-up operating parameters including a starting point of a duty cycle schedule of the receiver, wherein the duty cycle schedule specifies a period of the WUR duty cycle; and
enters WUR mode by communicating with a second communication apparatus, wherein a start timing of the WUR awake state is aligned with a target WUR Beacon transmission time (TWBTT) of the WUR Beacon transmission in the WUR mode or aligned with the TWBTT with an added constant time offset, wherein:
one of the wake-up operating parameters is a time resolution of a partial Time Synchronization Function (TSF); and
the time resolution of the partial TSF is negotiated between the communication apparatus and the second communication apparatus based on a WUR TSF timer accuracy of each communication apparatus associated with the second communication apparatus, the negotiated time resolution of the partial TSF being used to calculate a maximum correctable drift due to a partial TSF field, the calculated maximum correctable drift being used to set the WUR Beacon interval, the maximum correctable drift due to the partial TSF field being calculated by Equation (1), $$d_{max} = \pm 2^{(L_{pt}-1)} \times D_{pt} \qquad \text{Equation(1)}$$

wherein $L_{pt}$ is a size of the Partial TSF field and $D_{pt}$ is the time resolution of the Partial TSF field.

2. The communication apparatus according to claim 1, wherein the circuitry, in operation, determines the wake-up operating parameters via a WUR negotiation procedure, and enters the WUR mode via a WUR mode entry procedure.

3. The communication apparatus according to claim 1, wherein the circuitry, in operation, determines the wake-up operating parameters and enters the WUR mode via an integrated WUR negotiation and a WUR mode entry procedure.

4. The communication apparatus according to claim 1, wherein the wake-up operating parameters include a period of the duty cycle schedule of the receiver, and the period of the duty cycle schedule is an integer multiple of a WUR Beacon interval or a fraction of the WUR Beacon interval of the WUR Beacon transmission.

5. The communication apparatus according to claim 1, wherein one of the wake-up operating parameters is the WUR TSF timer accuracy.

6. The communication apparatus according to claim 1, wherein the wake-up operating parameters are classified into nonconfigurable wake-up operating parameters and configurable wake-up operating parameters.

7. The communication apparatus according to claim 6, wherein the communication apparatus exchanges the nonconfigurable wake-up operating parameters with the second communication apparatus via a synchronization procedure or an association procedure.

8. The communication apparatus according to claim 6, wherein the communication apparatus negotiates the configurable wake-up operating parameters with the second communication apparatus via a WUR negotiation procedure, and enters the WUR mode via a WUR mode entry procedure.

9. The communication apparatus according to claim 6, wherein the communication apparatus negotiates the configurable wake-up operating parameters with the second communication apparatus, and enters the WUR mode via an integrated WUR negotiation and WUR mode entry procedure.

10. The communication apparatus according to claim 6, wherein the communication apparatus negotiates the configurable wake-up operating parameters with the second communication apparatus via an association procedure, and enters the WUR mode via a WUR mode entry procedure.

11. The communication apparatus according to claim 6, wherein the communication apparatus operating in the WUR mode negotiates the configurable wake-up operating parameters with the second communication apparatus via a WUR negotiation procedure.

12. The communication apparatus according to claim 1, wherein the communication apparatus and a third communication apparatus are associated with the second communication apparatus, and the starting point of the duty cycle schedule of the communication apparatus is different from a starting point of a duty cycle schedule of the third communication apparatus.

13. The communication apparatus according to claim 4, wherein the communication apparatus and a third communication apparatus are associated with the second communication apparatus, and the period of the duty cycle schedule of the communication apparatus is same as a period of a duty cycle schedule of the third communication apparatus.

14. A method implemented by a communication apparatus, comprising:
  determining wake-up operating parameters including a starting point of a duty cycle schedule and entering Wake-up Radio (WUR) mode by communicating with a second communication apparatus, wherein the duty cycle schedule specifies a period of a WUR duty cycle, and wherein, during a WUR state, the communication apparatus continues to operate through a WUR beacon interval for two WUR duty cycles, the WUR beacon interval being configured for receiving one WUR Beacon transmission, and each WUR duty cycle including a WUR awake state and a WUR doze state; and
  receiving a WUR Beacon transmission in the WUR beacon interval and refraining from receiving buffered downlink traffic data during the WUR state,
  wherein a start timing of the WUR awake state is aligned with a target WUR Beacon transmission time (TWBTT) of the WUR Beacon transmission in the WUR mode or aligned with the TWBTT with an added constant time offset, and
  wherein one of the wake-up operating parameters is a time resolution of a partial Time Synchronization Function (TSF), the time resolution of the partial TSF being negotiated between the communication apparatus and the second communication apparatus based on a WUR TSF timer accuracy of each communication apparatus associated with the second communication apparatus, the negotiated time resolution of the partial TSF being used to calculate a maximum correctable drift due to a partial TSF field, the calculated maximum correctable drift being used to set the WUR Beacon interval, the maximum correctable drift due to the partial TSF field being calculated by Equation (1), $$d_{max} = \pm 2^{(L_{pt}-1)} \times D_{pt} \quad \text{Equation(1)}$$

wherein $L_{pt}$ is a size of the Partial TSF field and $D_{pt}$ is the time resolution of the Partial TSF field.

15. The communication apparatus according to claim 1, wherein each timing of the starting point of the duty cycle schedule of the receiver is aligned within a margin of the TSF timer accuracy.

16. A communication apparatus, comprising:
  a receiver which, in operation and in a Wake-up Radio (WUR) state, receives a WUR Beacon transmission in a WUR beacon interval, the receiver being configured not to receive buffered downlink traffic data during the WUR state, wherein, during the WUR state, the communication apparatus continues to operate through the WUR beacon interval for two WUR duty cycles, the WUR beacon interval being configured for receiving one WUR Beacon transmission, and each WUR duty cycle including a WUR awake state and a WUR doze state; and
  circuitry which, in operation:
    determines wake-up operating parameters including a starting point of a duty cycle schedule of the receiver, wherein the duty cycle schedule specifies a period of the WUR duty cycle; and
    enters WUR mode by communicating with a second communication apparatus, wherein a start timing of a target WUR Beacon transmission time (TWBTT) of the WUR Beacon transmission in the WUR mode is aligned with the WUR awake state or aligned with the WUR awake state with an added constant time offset,
  wherein:
    one of the wake-up operating parameters is a time resolution of a partial Time Synchronization Function (TSF); and
    the time resolution of the partial TSF is negotiated between the communication apparatus and the second communication apparatus based on a WUR TSF timer accuracy of each communication apparatus associated with the second communication apparatus, the negotiated time resolution of the partial TSF being used to calculate a maximum correctable drift due to a partial TSF field, the calculated maximum correctable drift being used to set the WUR Beacon interval, the maximum correctable drift due to the partial TSF field being calculated by Equation (1), $$d_{max} = \pm 2^{(L_{pt}-1)} \times D_{pt} \qquad \text{Equation(1)}$$

wherein $L_{pt}$ is a size of the Partial TSF field and $D_{pt}$ is the time resolution of the Partial TSF field.

17. The communication apparatus according to claim 1, wherein the circuitry, in operation:
   determines the wake-up operating parameters including nonconfigurable wake-up operating parameters and configurable wake-up operating parameters, wherein:
      the configurable wake-up operating parameters include the starting point of the duty cycle schedule of the receiver; and
      the nonconfigurable wake-up operating parameters include a time duration for turning on a primary connectivity radio of the communication apparatus.

* * * * *